(12) United States Patent
Wright

(10) Patent No.: US 10,678,787 B2
(45) Date of Patent: *Jun. 9, 2020

(54) COMPUTER ASSISTED COMPLETION OF HYPERLINK COMMAND SEGMENTS

(71) Applicant: Deephaven Data Labs LLC, Plymouth, MN (US)

(72) Inventor: Charles Wright, Cortlandt Manor, NY (US)

(73) Assignee: Deephaven Data Labs LLC, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/796,230

(22) Filed: Oct. 27, 2017

(65) Prior Publication Data

US 2018/0052879 A1 Feb. 22, 2018

Related U.S. Application Data

(63) Continuation of application No. 15/155,009, filed on May 14, 2016, now Pat. No. 9,836,495.

(Continued)

(51) Int. Cl.
*G06F 16/2453* (2019.01)
*G06F 16/23* (2019.01)
(Continued)

(52) U.S. Cl.
CPC ........ *G06F 16/2453* (2019.01); *G06F 3/0481* (2013.01); *G06F 3/0482* (2013.01); *G06F 3/0483* (2013.01); *G06F 3/0485* (2013.01); *G06F 3/04847* (2013.01); *G06F 3/04895* (2013.01); *G06F 3/0605* (2013.01); *G06F 3/067* (2013.01); *G06F 3/0656* (2013.01); *G06F 8/30* (2013.01); *G06F 8/41* (2013.01); *G06F 8/427* (2013.01); *G06F 8/60* (2013.01); *G06F 11/1451* (2013.01); *G06F 11/1464* (2013.01); *G06F 11/1469* (2013.01); *G06F 12/0261* (2013.01); *G06F 12/084* (2013.01); *G06F 12/1483* (2013.01); *G06F 15/17331* (2013.01);

(Continued)

(58) Field of Classification Search
None
See application file for complete search history.

(56) References Cited

U.S. PATENT DOCUMENTS 5,335,202 A 8/1994 Manning et al.
5,452,434 A 9/1995 Macdonald
(Continued)

FOREIGN PATENT DOCUMENTS

CA 2309462 A1 12/2000
EP 1406463 A2 4/2004
(Continued)

OTHER PUBLICATIONS

Mark G. Sobell, A Practical Guide to Linux, Commands, Editors and Shell Programming, Third Edition, Published: Sep. 14, 2012, pp. 1-4 (Year: 2012).*

(Continued)

*Primary Examiner* — Howard Cortes
(74) *Attorney, Agent, or Firm* — Carmichael IP, PLLC

(57) ABSTRACT

Described are methods, systems and computer readable media for computer assisted completion of hyperlink command segments.

22 Claims, 11 Drawing Sheets

Related U.S. Application Data

(60) Provisional application No. 62/161,813, filed on May 14, 2015.

(51) Int. Cl.

| | |
|---|---|
| *G06F 16/22* | (2019.01) |
| *G06F 16/27* | (2019.01) |
| *G06F 16/16* | (2019.01) |
| *G06F 16/215* | (2019.01) |
| *G06F 16/245* | (2019.01) |
| *G06F 16/248* | (2019.01) |
| *G06F 16/25* | (2019.01) |
| *G06F 16/28* | (2019.01) |
| *G06F 16/907* | (2019.01) |
| *G06F 16/951* | (2019.01) |
| *G06F 16/242* | (2019.01) |
| *G06F 16/2455* | (2019.01) |
| *G06F 16/2457* | (2019.01) |
| *G06F 16/901* | (2019.01) |
| *G06F 16/9535* | (2019.01) |
| *G06F 16/955* | (2019.01) |
| *G06F 16/957* | (2019.01) |
| *G06F 21/00* | (2013.01) |
| *G06F 21/62* | (2013.01) |
| *G06F 40/18* | (2020.01) |
| *G06F 40/134* | (2020.01) |
| *G06F 40/166* | (2020.01) |
| *G06F 40/177* | (2020.01) |
| *G06F 40/216* | (2020.01) |
| *G06F 40/274* | (2020.01) |
| *G06F 3/0482* | (2013.01) |
| *G06F 3/0489* | (2013.01) |
| *G06F 12/084* | (2016.01) |
| *H04L 12/58* | (2006.01) |
| *G06F 15/173* | (2006.01) |
| *G06F 3/0481* | (2013.01) |
| *G06F 3/0484* | (2013.01) |
| *G06F 3/0485* | (2013.01) |
| *G06F 12/02* | (2006.01) |
| *G06F 8/30* | (2018.01) |
| *G06F 8/41* | (2018.01) |
| *H04L 29/08* | (2006.01) |
| *G06F 3/06* | (2006.01) |
| *G06F 11/14* | (2006.01) |
| *H04L 29/06* | (2006.01) |
| *G06F 8/60* | (2018.01) |
| *H04L 12/18* | (2006.01) |
| *H04L 29/12* | (2006.01) |
| *G06F 12/14* | (2006.01) |
| *G06F 3/0483* | (2013.01) |
| *G06F 16/14* | (2019.01) |
| *G06F 16/11* | (2019.01) |
| *G06F 17/40* | (2006.01) |

(52) U.S. Cl.
CPC .......... *G06F 16/113* (2019.01); *G06F 16/144* (2019.01); *G06F 16/162* (2019.01); *G06F 16/215* (2019.01); *G06F 16/22* (2019.01); *G06F 16/221* (2019.01); *G06F 16/2228* (2019.01); *G06F 16/2237* (2019.01); *G06F 16/2246* (2019.01); *G06F 16/2255* (2019.01); *G06F 16/2264* (2019.01); *G06F 16/2272* (2019.01); *G06F 16/2282* (2019.01); *G06F 16/23* (2019.01); *G06F 16/2308* (2019.01); *G06F 16/2358* (2019.01); *G06F 16/2365* (2019.01); *G06F 16/2372* (2019.01); *G06F 16/2379* (2019.01); *G06F 16/242* (2019.01); *G06F 16/245* (2019.01); *G06F 16/248* (2019.01); *G06F 16/2428* (2019.01); *G06F 16/2455* (2019.01); *G06F 16/2456* (2019.01); *G06F 16/2457* (2019.01); *G06F 16/24534* (2019.01); *G06F 16/24535* (2019.01); *G06F 16/24537* (2019.01); *G06F 16/24539* (2019.01); *G06F 16/24553* (2019.01); *G06F 16/24575* (2019.01); *G06F 16/254* (2019.01); *G06F 16/27* (2019.01); *G06F 16/278* (2019.01); *G06F 16/285* (2019.01); *G06F 16/907* (2019.01); *G06F 16/9024* (2019.01); *G06F 16/951* (2019.01); *G06F 16/9535* (2019.01); *G06F 16/9566* (2019.01); *G06F 16/9574* (2019.01); *G06F 21/00* (2013.01); *G06F 21/6209* (2013.01); *G06F 40/134* (2020.01); *G06F 40/166* (2020.01); *G06F 40/177* (2020.01); *G06F 40/18* (2020.01); *G06F 40/216* (2020.01); *G06F 40/274* (2020.01); *H04L 12/18* (2013.01); *H04L 51/046* (2013.01); *H04L 51/12* (2013.01); *H04L 61/2069* (2013.01); *H04L 63/101* (2013.01); *H04L 63/102* (2013.01); *H04L 67/1002* (2013.01); *H04L 67/141* (2013.01); *H04L 67/28* (2013.01); *H04L 67/2833* (2013.01); *H04L 67/2842* (2013.01); *H04L 67/34* (2013.01); *H04L 67/42* (2013.01); *H04L 69/16* (2013.01); *G06F 16/2291* (2019.01); *G06F 17/40* (2013.01); *G06F 2201/805* (2013.01); *G06F 2201/84* (2013.01); *G06F 2212/1052* (2013.01); *G06F 2212/154* (2013.01); *G06F 2212/163* (2013.01); *G06F 2212/60* (2013.01); *H04L 67/2847* (2013.01)

(56) References Cited

U.S. PATENT DOCUMENTS

| | | |
|---|---|---|
| 5,469,567 A | 11/1995 | Okada |
| 5,504,885 A | 4/1996 | Alashqur |
| 5,530,939 A | 6/1996 | Mansfield et al. |
| 5,568,632 A | 10/1996 | Nelson |
| 5,673,369 A | 9/1997 | Kim |
| 5,701,461 A | 12/1997 | Dalal et al. |
| 5,701,467 A | 12/1997 | Freeston |
| 5,764,953 A | 6/1998 | Collins et al. |
| 5,787,411 A | 7/1998 | Groff et al. |
| 5,787,428 A | 7/1998 | Hart |
| 5,806,059 A | 9/1998 | Tsuchida et al. |
| 5,808,911 A | 9/1998 | Tucker et al. |
| 5,859,972 A | 1/1999 | Subramaniam et al. |
| 5,873,075 A | 2/1999 | Cochrane et al. |
| 5,875,334 A | 2/1999 | Chow et al. |
| 5,878,415 A | 3/1999 | Olds |
| 5,890,167 A | 3/1999 | Bridge et al. |
| 5,899,990 A | 5/1999 | Maritzen et al. |
| 5,920,860 A | 7/1999 | Maheshwari et al. |
| 5,943,672 A | 8/1999 | Yoshida |
| 5,960,087 A | 9/1999 | Tribble et al. |
| 5,991,810 A | 11/1999 | Shapiro et al. |
| 5,999,918 A | 12/1999 | Williams et al. |
| 6,006,220 A | 12/1999 | Haderle et al. |
| 6,032,144 A | 2/2000 | Srivastava et al. |
| 6,032,148 A | 2/2000 | Wilkes |
| 6,038,563 A | 3/2000 | Bapat et al. |
| 6,058,394 A | 5/2000 | Bakow et al. |
| 6,061,684 A | 5/2000 | Glasser et al. |
| 6,138,112 A | 10/2000 | Slutz |
| 6,160,548 A | 12/2000 | Lea et al. |
| 6,253,195 B1 | 6/2001 | Hudis et al. |
| 6,266,669 B1 | 7/2001 | Brodersen et al. |
| 6,289,357 B1 | 9/2001 | Parker |

(56) References Cited

U.S. PATENT DOCUMENTS

| | | |
|---|---|---|
| 6,292,803 B1 | 9/2001 | Richardson et al. |
| 6,304,876 B1 | 10/2001 | Isip |
| 6,317,728 B1 | 11/2001 | Kane |
| 6,327,702 B1 | 12/2001 | Sauntry et al. |
| 6,336,114 B1 | 1/2002 | Garrison |
| 6,353,819 B1 | 3/2002 | Edwards et al. |
| 6,367,068 B1 | 4/2002 | Vaidyanathan et al. |
| 6,389,414 B1 | 5/2002 | Delo et al. |
| 6,389,462 B1 | 5/2002 | Cohen et al. |
| 6,397,206 B1 | 5/2002 | Hill et al. |
| 6,438,537 B1 | 8/2002 | Netz et al. |
| 6,446,069 B1 | 9/2002 | Yaung et al. |
| 6,460,037 B1 | 10/2002 | Weiss et al. |
| 6,473,750 B1 | 10/2002 | Petculescu et al. |
| 6,487,552 B1 | 11/2002 | Lei et al. |
| 6,496,833 B1 | 12/2002 | Goldberg et al. |
| 6,505,189 B1 | 1/2003 | Au et al. |
| 6,505,241 B2 | 1/2003 | Pitts |
| 6,510,551 B1 | 1/2003 | Miller |
| 6,519,604 B1 | 2/2003 | Acharya et al. |
| 6,530,075 B1 | 3/2003 | Beadle et al. |
| 6,538,651 B1 | 3/2003 | Hayman et al. |
| 6,546,402 B1 | 4/2003 | Beyer et al. |
| 6,553,375 B1 | 4/2003 | Huang et al. |
| 6,584,474 B1 | 6/2003 | Pereira |
| 6,604,104 B1 | 8/2003 | Smith |
| 6,618,720 B1 | 9/2003 | Au et al. |
| 6,631,374 B1 | 10/2003 | Klein et al. |
| 6,640,234 B1 | 10/2003 | Coffen et al. |
| 6,697,880 B1 | 2/2004 | Dougherty |
| 6,701,415 B1 | 3/2004 | Hendren |
| 6,714,962 B1 | 3/2004 | Helland et al. |
| 6,725,243 B2 | 4/2004 | Snapp |
| 6,732,100 B1 | 5/2004 | Brodersen et al. |
| 6,745,332 B1 | 6/2004 | Wong et al. |
| 6,748,374 B1 | 6/2004 | Madan et al. |
| 6,748,455 B1 | 6/2004 | Hinson et al. |
| 6,760,719 B1 | 7/2004 | Hanson et al. |
| 6,775,660 B2 | 8/2004 | Lin et al. |
| 6,785,668 B1 | 8/2004 | Polo et al. |
| 6,795,851 B1 | 9/2004 | Noy |
| 6,801,908 B1 | 10/2004 | Fuloria et al. |
| 6,816,855 B2 | 11/2004 | Hartel et al. |
| 6,820,082 B1 | 11/2004 | Cook et al. |
| 6,829,620 B2 | 12/2004 | Michael et al. |
| 6,832,229 B2 | 12/2004 | Reed |
| 6,851,088 B1 | 2/2005 | Conner et al. |
| 6,882,994 B2 | 4/2005 | Yoshimura et al. |
| 6,925,472 B2 | 8/2005 | Kong |
| 6,934,717 B1 | 8/2005 | James |
| 6,947,928 B2 | 9/2005 | Dettinger et al. |
| 6,983,291 B1 | 1/2006 | Cochrane et al. |
| 6,985,895 B2 | 1/2006 | Witkowski et al. |
| 6,985,899 B2 | 1/2006 | Chan et al. |
| 6,985,904 B1 | 1/2006 | Kaluskar et al. |
| 7,020,649 B2 | 3/2006 | Cochrane et al. |
| 7,024,414 B2 | 4/2006 | Sah et al. |
| 7,031,962 B2 | 4/2006 | Moses |
| 7,047,484 B1 | 5/2006 | Becker et al. |
| 7,058,657 B1 | 6/2006 | Berno |
| 7,089,228 B2 | 8/2006 | Arnold et al. |
| 7,089,245 B1 | 8/2006 | George et al. |
| 7,096,216 B2 | 8/2006 | Anonsen |
| 7,099,927 B2 | 8/2006 | Cudd et al. |
| 7,103,608 B1 | 9/2006 | Ozbutun et al. |
| 7,110,997 B1 | 9/2006 | Turkel et al. |
| 7,127,462 B2 | 10/2006 | Hiraga et al. |
| 7,146,357 B2 | 12/2006 | Suzuki et al. |
| 7,149,742 B1 | 12/2006 | Eastham et al. |
| 7,167,870 B2 | 1/2007 | Avvari et al. |
| 7,171,469 B2 | 1/2007 | Ackaouy et al. |
| 7,174,341 B2 | 2/2007 | Ghukasyan et al. |
| 7,181,686 B1 | 2/2007 | Bahrs |
| 7,188,105 B2 | 3/2007 | Dettinger et al. |
| 7,200,620 B2 | 4/2007 | Gupta |
| 7,216,115 B1 | 5/2007 | Walters et al. |
| 7,216,116 B1 | 5/2007 | Nilsson et al. |
| 7,219,302 B1 | 5/2007 | O'Shaughnessy et al. |
| 7,225,189 B1 | 5/2007 | McCormack et al. |
| 7,254,808 B2 | 8/2007 | Trappen et al. |
| 7,257,689 B1 | 8/2007 | Baird |
| 7,272,605 B1 | 9/2007 | Hinshaw et al. |
| 7,308,580 B2 | 12/2007 | Nelson et al. |
| 7,316,003 B1 | 1/2008 | Dulepet et al. |
| 7,330,969 B2 | 2/2008 | Harrison et al. |
| 7,333,941 B1 | 2/2008 | Choi |
| 7,343,585 B1 | 3/2008 | Lau et al. |
| 7,350,237 B2 | 3/2008 | Vogel et al. |
| 7,380,242 B2 | 5/2008 | Alaluf |
| 7,401,088 B2 | 7/2008 | Chintakayala et al. |
| 7,426,521 B2 | 9/2008 | Harter |
| 7,430,549 B2 | 9/2008 | Zane et al. |
| 7,433,863 B2 | 10/2008 | Zane et al. |
| 7,447,865 B2 | 11/2008 | Uppala et al. |
| 7,478,094 B2 | 1/2009 | Ho et al. |
| 7,484,096 B1 | 1/2009 | Garg et al. |
| 7,493,311 B1 | 2/2009 | Cutsinger et al. |
| 7,506,055 B2 | 3/2009 | McClain et al. |
| 7,529,734 B2 | 5/2009 | Dirisala |
| 7,529,750 B2 | 5/2009 | Bair |
| 7,542,958 B1 | 6/2009 | Warren et al. |
| 7,552,223 B1 | 6/2009 | Ackaouy et al. |
| 7,596,550 B2 | 9/2009 | Mordvinov et al. |
| 7,610,351 B1 | 10/2009 | Gollapudi et al. |
| 7,620,687 B2 | 11/2009 | Chen et al. |
| 7,624,126 B2 | 11/2009 | Pizzo et al. |
| 7,627,603 B2 | 12/2009 | Rosenblum et al. |
| 7,661,141 B2 | 2/2010 | Dutta et al. |
| 7,664,778 B2 | 2/2010 | Yagoub et al. |
| 7,672,275 B2 | 3/2010 | Yajnik et al. |
| 7,680,782 B2 | 3/2010 | Chen et al. |
| 7,711,716 B2 | 5/2010 | Stonecipher |
| 7,711,740 B2 | 5/2010 | Minore et al. |
| 7,711,788 B2 | 5/2010 | Ran et al. |
| 7,747,640 B2 | 6/2010 | Dettinger et al. |
| 7,761,444 B2 | 7/2010 | Zhang et al. |
| 7,797,356 B2 | 9/2010 | Iyer et al. |
| 7,827,204 B2 | 11/2010 | Heinzel et al. |
| 7,827,403 B2 | 11/2010 | Wong et al. |
| 7,827,523 B2 | 11/2010 | Ahmed et al. |
| 7,882,121 B2 | 2/2011 | Bruno et al. |
| 7,882,132 B2 | 2/2011 | Ghatare |
| 7,895,191 B2 | 2/2011 | Colossi et al. |
| 7,904,487 B2 | 3/2011 | Ghatare |
| 7,908,259 B2 | 3/2011 | Branscome et al. |
| 7,908,266 B2 | 3/2011 | Zeringue et al. |
| 7,930,412 B2 | 4/2011 | Yeap et al. |
| 7,966,311 B2 | 6/2011 | Haase |
| 7,966,312 B2 | 6/2011 | Nolan et al. |
| 7,966,343 B2 | 6/2011 | Yang et al. |
| 7,970,777 B2 | 6/2011 | Saxena et al. |
| 7,979,431 B2 | 7/2011 | Qazi et al. |
| 7,984,043 B1 | 7/2011 | Waas |
| 8,019,795 B2 | 9/2011 | Anderson et al. |
| 8,027,293 B2 | 9/2011 | Spaur et al. |
| 8,032,525 B2 | 10/2011 | Bowers et al. |
| 8,037,542 B2 | 10/2011 | Taylor et al. |
| 8,046,394 B1 | 10/2011 | Shatdal |
| 8,046,749 B1 | 10/2011 | Owen et al. |
| 8,055,672 B2 | 11/2011 | Djugash et al. |
| 8,060,484 B2 | 11/2011 | Bandera et al. |
| 8,171,018 B2 | 5/2012 | Zane et al. |
| 8,180,789 B1 | 5/2012 | Wasserman et al. |
| 8,196,121 B2 | 6/2012 | Peshansky et al. |
| 8,209,356 B1 | 6/2012 | Roesler |
| 8,286,189 B2 | 10/2012 | Kukreja et al. |
| 8,321,833 B2 | 11/2012 | Langworthy et al. |
| 8,332,435 B2 | 12/2012 | Ballard et al. |
| 8,359,305 B1 | 1/2013 | Burke et al. |
| 8,375,127 B1 | 2/2013 | Lita |
| 8,380,757 B1 | 2/2013 | Bailey et al. |
| 8,418,142 B2 | 4/2013 | Ao et al. |
| 8,433,701 B2 | 4/2013 | Sargeant et al. |
| 8,458,218 B2 | 6/2013 | Wildermuth |

(56) References Cited

U.S. PATENT DOCUMENTS

| | | |
|---|---|---|
| 8,473,897 B2 | 6/2013 | Box et al. |
| 8,478,713 B2 | 7/2013 | Cotner et al. |
| 8,515,942 B2 | 8/2013 | Marum et al. |
| 8,543,620 B2 | 9/2013 | Ching |
| 8,553,028 B1 | 10/2013 | Urbach |
| 8,555,263 B2 | 10/2013 | Allen et al. |
| 8,560,502 B2 | 10/2013 | Vora |
| 8,595,151 B2 | 11/2013 | Hao et al. |
| 8,601,016 B2 | 12/2013 | Briggs et al. |
| 8,621,424 B2 | 12/2013 | Kejariwal et al. |
| 8,631,034 B1 | 1/2014 | Peloski |
| 8,635,251 B1 | 1/2014 | Chan |
| 8,650,182 B2 | 2/2014 | Murthy |
| 8,660,869 B2 | 2/2014 | MacIntyre et al. |
| 8,676,863 B1 | 3/2014 | Connell et al. |
| 8,683,488 B2 | 3/2014 | Kukreja et al. |
| 8,713,518 B2 | 4/2014 | Pointer et al. |
| 8,719,252 B2 | 5/2014 | Miranker et al. |
| 8,725,707 B2 | 5/2014 | Chen et al. |
| 8,726,254 B2 | 5/2014 | Rohde et al. |
| 8,745,014 B2 | 6/2014 | Travis |
| 8,745,510 B2 | 6/2014 | D'Alo' et al. |
| 8,751,823 B2 | 6/2014 | Myles et al. |
| 8,768,961 B2 | 7/2014 | Krishnamurthy |
| 8,788,254 B2 | 7/2014 | Peloski |
| 8,793,243 B2 | 7/2014 | Weyerhaeuser et al. |
| 8,805,875 B1 | 8/2014 | Bawcom et al. |
| 8,805,947 B1 | 8/2014 | Kuzkin et al. |
| 8,806,133 B2 | 8/2014 | Hay et al. |
| 8,812,625 B1 | 8/2014 | Chitilian et al. |
| 8,838,656 B1 | 9/2014 | Cheriton |
| 8,855,999 B1 | 10/2014 | Elliot |
| 8,863,156 B1 | 10/2014 | Lepanto et al. |
| 8,874,512 B2 | 10/2014 | Jin et al. |
| 8,880,569 B2 | 11/2014 | Draper et al. |
| 8,880,787 B1 | 11/2014 | Kimmel et al. |
| 8,881,121 B2 | 11/2014 | Ali |
| 8,886,631 B2 | 11/2014 | Abadi et al. |
| 8,903,717 B2 | 12/2014 | Elliot |
| 8,903,842 B2 | 12/2014 | Bloesch et al. |
| 8,922,579 B2 | 12/2014 | Mi et al. |
| 8,924,384 B2 | 12/2014 | Driesen et al. |
| 8,930,892 B2 | 1/2015 | Pointer et al. |
| 8,954,418 B2 | 2/2015 | Faerber et al. |
| 8,959,495 B2 | 2/2015 | Chafi et al. |
| 8,996,864 B2 | 3/2015 | Maigne et al. |
| 9,031,930 B2 | 5/2015 | Valentin |
| 9,077,611 B2 | 7/2015 | Cordray et al. |
| 9,122,765 B1 | 9/2015 | Chen |
| 9,177,079 B1 | 11/2015 | Ramachandran et al. |
| 9,195,712 B2 | 11/2015 | Freedman et al. |
| 9,298,768 B2 | 3/2016 | Varakin et al. |
| 9,311,357 B2 | 4/2016 | Ramesh et al. |
| 9,372,671 B2 | 6/2016 | Balan et al. |
| 9,384,184 B2 * | 7/2016 | Acuna .................. G06F 17/276 |
| 9,477,702 B1 | 10/2016 | Ramachandran et al. |
| 9,612,959 B2 | 4/2017 | Caudy et al. |
| 9,613,018 B2 | 4/2017 | Zeldis et al. |
| 9,613,109 B2 | 4/2017 | Wright et al. |
| 9,619,210 B2 | 4/2017 | Kent, IV et al. |
| 9,633,060 B2 | 4/2017 | Caudy et al. |
| 9,639,570 B2 | 5/2017 | Wright et al. |
| 9,672,238 B2 | 6/2017 | Wright et al. |
| 9,679,006 B2 | 6/2017 | Wright et al. |
| 9,690,821 B2 | 6/2017 | Wright et al. |
| 9,710,511 B2 | 7/2017 | Wright et al. |
| 9,760,591 B2 | 9/2017 | Caudy et al. |
| 9,805,084 B2 | 10/2017 | Wright et al. |
| 9,832,068 B2 | 11/2017 | McSherry et al. |
| 9,836,494 B2 | 12/2017 | Caudy et al. |
| 9,836,495 B2 | 12/2017 | Wright |
| 9,886,469 B2 | 2/2018 | Kent, IV et al. |
| 9,898,496 B2 | 2/2018 | Caudy et al. |
| 9,934,266 B2 | 4/2018 | Wright et al. |
| 10,002,153 B2 | 6/2018 | Teodorescu et al. |
| 10,002,154 B1 | 6/2018 | Kent, IV et al. |
| 10,002,155 B1 | 6/2018 | Caudy et al. |
| 10,003,673 B2 | 6/2018 | Caudy et al. |
| 10,019,138 B2 | 7/2018 | Zeldis et al. |
| 10,069,943 B2 | 9/2018 | Teodorescu et al. |
| 2002/0002576 A1 | 1/2002 | Wollrath et al. |
| 2002/0007331 A1 | 1/2002 | Lo et al. |
| 2002/0054587 A1 | 5/2002 | Baker et al. |
| 2002/0065981 A1 | 5/2002 | Jenne et al. |
| 2002/0129168 A1 | 9/2002 | Kanai et al. |
| 2002/0156722 A1 | 10/2002 | Greenwood |
| 2003/0004952 A1 | 1/2003 | Nixon et al. |
| 2003/0061216 A1 | 3/2003 | Moses |
| 2003/0074400 A1 | 4/2003 | Brooks et al. |
| 2003/0110416 A1 | 6/2003 | Morrison et al. |
| 2003/0167261 A1 | 9/2003 | Grust et al. |
| 2003/0182261 A1 | 9/2003 | Patterson |
| 2003/0208484 A1 | 11/2003 | Chang et al. |
| 2003/0208505 A1 | 11/2003 | Mullins et al. |
| 2003/0233632 A1 | 12/2003 | Aigen et al. |
| 2004/0002961 A1 | 1/2004 | Dellinger et al. |
| 2004/0015566 A1 | 1/2004 | Anderson et al. |
| 2004/0076155 A1 | 4/2004 | Yajnik et al. |
| 2004/0111492 A1 | 6/2004 | Nakahara et al. |
| 2004/0148630 A1 | 7/2004 | Choi |
| 2004/0186813 A1 | 9/2004 | Tedesco et al. |
| 2004/0216150 A1 | 10/2004 | Scheifler et al. |
| 2004/0220923 A1 | 11/2004 | Nica |
| 2004/0254876 A1 | 12/2004 | Coval et al. |
| 2004/0267824 A1 | 12/2004 | Pizzo et al. |
| 2005/0015490 A1 | 1/2005 | Saare et al. |
| 2005/0060693 A1* | 3/2005 | Robison .............. G06F 9/45512 717/143 |
| 2005/0097447 A1 | 5/2005 | Serra et al. |
| 2005/0102284 A1 | 5/2005 | Srinivasan et al. |
| 2005/0102636 A1 | 5/2005 | McKeon et al. |
| 2005/0131893 A1 | 6/2005 | Glan |
| 2005/0132384 A1 | 6/2005 | Morrison et al. |
| 2005/0138624 A1 | 6/2005 | Morrison et al. |
| 2005/0144189 A1 | 6/2005 | Edwards et al. |
| 2005/0165866 A1 | 7/2005 | Bohannon et al. |
| 2005/0198001 A1 | 9/2005 | Cunningham et al. |
| 2005/0228828 A1 | 10/2005 | Chandrasekar et al. |
| 2006/0059253 A1 | 3/2006 | Goodman et al. |
| 2006/0074901 A1 | 4/2006 | Pirahesh et al. |
| 2006/0085490 A1 | 4/2006 | Baron et al. |
| 2006/0100989 A1 | 5/2006 | Chinchwadkar et al. |
| 2006/0101019 A1 | 5/2006 | Nelson et al. |
| 2006/0116983 A1 | 6/2006 | Dettinger et al. |
| 2006/0116999 A1 | 6/2006 | Dettinger et al. |
| 2006/0131383 A1 | 6/2006 | Battagin et al. |
| 2006/0136361 A1 | 6/2006 | Peri et al. |
| 2006/0173693 A1 | 8/2006 | Arazi et al. |
| 2006/0195460 A1 | 8/2006 | Nori et al. |
| 2006/0212847 A1 | 9/2006 | Tarditi et al. |
| 2006/0218123 A1 | 9/2006 | Chowdhuri et al. |
| 2006/0218200 A1 | 9/2006 | Factor et al. |
| 2006/0230016 A1 | 10/2006 | Cunningham et al. |
| 2006/0253311 A1 | 11/2006 | Yin et al. |
| 2006/0271510 A1 | 11/2006 | Harward et al. |
| 2006/0277162 A1 | 12/2006 | Smith |
| 2007/0011211 A1 | 1/2007 | Reeves et al. |
| 2007/0027884 A1 | 2/2007 | Heger et al. |
| 2007/0033518 A1 | 2/2007 | Kenna et al. |
| 2007/0073765 A1 | 3/2007 | Chen |
| 2007/0101252 A1 | 5/2007 | Chamberlain et al. |
| 2007/0113014 A1 | 5/2007 | Manolov et al. |
| 2007/0116287 A1 | 5/2007 | Rasizade et al. |
| 2007/0169003 A1 | 7/2007 | Branda et al. |
| 2007/0198479 A1 | 8/2007 | Cai et al. |
| 2007/0256060 A1 | 11/2007 | Ryu et al. |
| 2007/0258508 A1 | 11/2007 | Werb et al. |
| 2007/0271280 A1 | 11/2007 | Chandasekaran |
| 2007/0294217 A1 | 12/2007 | Chen et al. |
| 2007/0299822 A1 | 12/2007 | Jopp et al. |
| 2008/0022136 A1 | 1/2008 | Mattsson et al. |
| 2008/0033907 A1 | 2/2008 | Woehler et al. |
| 2008/0034084 A1 | 2/2008 | Pandya |
| 2008/0046804 A1 | 2/2008 | Rui et al. |

(56) References Cited

U.S. PATENT DOCUMENTS

| | | | |
|---|---|---|---|
| 2008/0072150 A1 | 3/2008 | Chan et al. | |
| 2008/0097748 A1 | 4/2008 | Haley et al. | |
| 2008/0120283 A1 | 5/2008 | Liu et al. | |
| 2008/0155565 A1* | 6/2008 | Poduri | G06F 9/4446 719/320 |
| 2008/0168135 A1 | 7/2008 | Redlich et al. | |
| 2008/0172639 A1 | 7/2008 | Keysar et al. | |
| 2008/0235238 A1* | 9/2008 | Jalobeanu | G06Q 10/107 |
| 2008/0263179 A1 | 10/2008 | Buttner et al. | |
| 2008/0276241 A1 | 11/2008 | Bajpai et al. | |
| 2008/0319951 A1 | 12/2008 | Ueno et al. | |
| 2009/0019029 A1 | 1/2009 | Tommaney et al. | |
| 2009/0022095 A1 | 1/2009 | Spaur et al. | |
| 2009/0024615 A1 | 1/2009 | Pedro et al. | |
| 2009/0037391 A1 | 2/2009 | Agrawal et al. | |
| 2009/0037500 A1 | 2/2009 | Kirshenbaum | |
| 2009/0055370 A1 | 2/2009 | Dagum et al. | |
| 2009/0083215 A1 | 3/2009 | Burger | |
| 2009/0089312 A1 | 4/2009 | Chi et al. | |
| 2009/0248902 A1* | 10/2009 | Blue | G06F 9/45512 710/5 |
| 2009/0254516 A1 | 10/2009 | Meiyyappan et al. | |
| 2009/0271472 A1 | 10/2009 | Scheifler et al. | |
| 2009/0300770 A1 | 12/2009 | Rowney et al. | |
| 2009/0319058 A1 | 12/2009 | Rovaglio et al. | |
| 2009/0319484 A1 | 12/2009 | Golbandi et al. | |
| 2009/0327242 A1 | 12/2009 | Brown et al. | |
| 2010/0023952 A1 | 1/2010 | Sandoval et al. | |
| 2010/0036801 A1 | 2/2010 | Pirvali et al. | |
| 2010/0042587 A1 | 2/2010 | Johnson et al. | |
| 2010/0047760 A1 | 2/2010 | Best et al. | |
| 2010/0049715 A1 | 2/2010 | Jacobsen et al. | |
| 2010/0070721 A1 | 3/2010 | Pugh et al. | |
| 2010/0114890 A1 | 5/2010 | Hagar et al. | |
| 2010/0161555 A1 | 6/2010 | Nica et al. | |
| 2010/0186082 A1 | 7/2010 | Ladki et al. | |
| 2010/0199161 A1 | 8/2010 | Aureglia et al. | |
| 2010/0205017 A1 | 8/2010 | Sichelman et al. | |
| 2010/0205351 A1 | 8/2010 | Wiener et al. | |
| 2010/0281005 A1 | 11/2010 | Carlin et al. | |
| 2010/0281071 A1 | 11/2010 | Ben-Zvi et al. | |
| 2011/0126110 A1 | 5/2011 | Vilke et al. | |
| 2011/0126154 A1* | 5/2011 | Boehler | G06F 3/0237 715/811 |
| 2011/0153603 A1 | 6/2011 | Adiba et al. | |
| 2011/0161378 A1 | 6/2011 | Williamson | |
| 2011/0167020 A1 | 7/2011 | Yang et al. | |
| 2011/0178984 A1 | 7/2011 | Talius et al. | |
| 2011/0194563 A1 | 8/2011 | Shen et al. | |
| 2011/0219020 A1 | 9/2011 | Oks et al. | |
| 2011/0314019 A1 | 12/2011 | Peris | |
| 2012/0110030 A1 | 5/2012 | Pomponio | |
| 2012/0144234 A1 | 6/2012 | Clark et al. | |
| 2012/0159303 A1 | 6/2012 | Friedrich et al. | |
| 2012/0191446 A1 | 7/2012 | Binsztok et al. | |
| 2012/0192096 A1* | 7/2012 | Bowman | G06F 3/0481 715/780 |
| 2012/0197868 A1 | 8/2012 | Fauser et al. | |
| 2012/0209886 A1 | 8/2012 | Henderson | |
| 2012/0215741 A1 | 8/2012 | Poole et al. | |
| 2012/0221528 A1 | 8/2012 | Renkes | |
| 2012/0246052 A1 | 9/2012 | Taylor et al. | |
| 2012/0254143 A1 | 10/2012 | Varma et al. | |
| 2012/0259759 A1 | 10/2012 | Crist et al. | |
| 2012/0296846 A1 | 11/2012 | Teeter | |
| 2013/0041946 A1 | 2/2013 | Joel et al. | |
| 2013/0080514 A1* | 3/2013 | Gupta | G06F 9/4443 709/203 |
| 2013/0086107 A1 | 4/2013 | Genochio et al. | |
| 2013/0166551 A1 | 6/2013 | Wong et al. | |
| 2013/0166556 A1 | 6/2013 | Baeumges et al. | |
| 2013/0173667 A1 | 7/2013 | Soderberg et al. | |
| 2013/0179460 A1 | 7/2013 | Cervantes et al. | |
| 2013/0185619 A1 | 7/2013 | Ludwig | |
| 2013/0191370 A1 | 7/2013 | Chen et al. | |
| 2013/0198232 A1 | 8/2013 | Shamgunov et al. | |
| 2013/0226959 A1 | 8/2013 | Dittrich et al. | |
| 2013/0246560 A1 | 9/2013 | Feng et al. | |
| 2013/0263123 A1 | 10/2013 | Zhou et al. | |
| 2013/0290243 A1 | 10/2013 | Hazel et al. | |
| 2013/0304725 A1 | 11/2013 | Nee et al. | |
| 2013/0304744 A1 | 11/2013 | McSherry et al. | |
| 2013/0311352 A1 | 11/2013 | Kayanuma et al. | |
| 2013/0311488 A1 | 11/2013 | Erdogan et al. | |
| 2013/0318129 A1 | 11/2013 | Vingralek et al. | |
| 2013/0346365 A1 | 12/2013 | Kan et al. | |
| 2014/0019494 A1 | 1/2014 | Tang | |
| 2014/0026121 A1 | 1/2014 | Jackson et al. | |
| 2014/0040203 A1 | 2/2014 | Lu et al. | |
| 2014/0046638 A1 | 2/2014 | Peloski | |
| 2014/0059646 A1 | 2/2014 | Hannel et al. | |
| 2014/0082470 A1 | 3/2014 | Trebas et al. | |
| 2014/0082724 A1 | 3/2014 | Pearson et al. | |
| 2014/0136521 A1 | 5/2014 | Pappas | |
| 2014/0143123 A1 | 5/2014 | Banke et al. | |
| 2014/0149997 A1 | 5/2014 | Kukreja et al. | |
| 2014/0156618 A1 | 6/2014 | Castellano | |
| 2014/0173023 A1 | 6/2014 | Varney et al. | |
| 2014/0181036 A1 | 6/2014 | Dhamankar et al. | |
| 2014/0181081 A1 | 6/2014 | Veldhuizen | |
| 2014/0188924 A1 | 7/2014 | Ma et al. | |
| 2014/0195558 A1 | 7/2014 | Murthy et al. | |
| 2014/0201194 A1 | 7/2014 | Reddy et al. | |
| 2014/0215446 A1 | 7/2014 | Araya et al. | |
| 2014/0222768 A1 | 8/2014 | Rambo et al. | |
| 2014/0229506 A1 | 8/2014 | Lee | |
| 2014/0229874 A1 | 8/2014 | Strauss | |
| 2014/0244687 A1 | 8/2014 | Shmueli et al. | |
| 2014/0279810 A1 | 9/2014 | Mann et al. | |
| 2014/0280522 A1 | 9/2014 | Watte | |
| 2014/0282227 A1 | 9/2014 | Nixon et al. | |
| 2014/0282444 A1 | 9/2014 | Araya et al. | |
| 2014/0282540 A1 | 9/2014 | Bonnet et al. | |
| 2014/0289700 A1 | 9/2014 | Srinivasaraghavan et al. | |
| 2014/0292765 A1 | 10/2014 | Maruyama et al. | |
| 2014/0297611 A1 | 10/2014 | Abbour et al. | |
| 2014/0317084 A1 | 10/2014 | Chaudhry et al. | |
| 2014/0324821 A1 | 10/2014 | Meiyyappan et al. | |
| 2014/0330700 A1 | 11/2014 | Studnitzer et al. | |
| 2014/0330807 A1 | 11/2014 | Weyerhaeuser et al. | |
| 2014/0344186 A1 | 11/2014 | Nadler | |
| 2014/0344391 A1 | 11/2014 | Varney et al. | |
| 2014/0358892 A1 | 12/2014 | Nizami et al. | |
| 2014/0359574 A1* | 12/2014 | Beckwith | G06F 8/33 717/113 |
| 2014/0372482 A1 | 12/2014 | Martin et al. | |
| 2014/0380051 A1 | 12/2014 | Edward et al. | |
| 2015/0019516 A1 | 1/2015 | Wein et al. | |
| 2015/0026155 A1 | 1/2015 | Martin | |
| 2015/0032789 A1 | 1/2015 | Nguyen et al. | |
| 2015/0067640 A1* | 3/2015 | Booker | G06F 8/33 717/109 |
| 2015/0074066 A1 | 3/2015 | Li et al. | |
| 2015/0082218 A1 | 3/2015 | Affoneh et al. | |
| 2015/0088894 A1 | 3/2015 | Czarlinska et al. | |
| 2015/0095381 A1 | 4/2015 | Chen et al. | |
| 2015/0120261 A1 | 4/2015 | Giannacopoulos et al. | |
| 2015/0127599 A1 | 5/2015 | Schiebeler | |
| 2015/0154262 A1 | 6/2015 | Yang et al. | |
| 2015/0172117 A1 | 6/2015 | Dolinsky et al. | |
| 2015/0188778 A1 | 7/2015 | Asayag et al. | |
| 2015/0205588 A1 | 7/2015 | Bates et al. | |
| 2015/0205589 A1 | 7/2015 | Dally | |
| 2015/0254298 A1 | 9/2015 | Bourbonnais et al. | |
| 2015/0304182 A1 | 10/2015 | Brodsky et al. | |
| 2015/0317359 A1 | 11/2015 | Tran et al. | |
| 2015/0356157 A1 | 12/2015 | Anderson et al. | |
| 2016/0026383 A1 | 1/2016 | Lee et al. | |
| 2016/0026442 A1 | 1/2016 | Chhaparia | |
| 2016/0065670 A1 | 3/2016 | Kimmel et al. | |
| 2016/0085772 A1 | 3/2016 | Vermeulen et al. | |
| 2016/0092599 A1 | 3/2016 | Barsness et al. | |
| 2016/0103897 A1 | 4/2016 | Nysewander et al. | |

(56) References Cited

U.S. PATENT DOCUMENTS

| | | | |
|---|---|---|---|
| 2016/0125018 A1 | 5/2016 | Tomoda et al. | |
| 2016/0147748 A1 | 5/2016 | Florendo et al. | |
| 2016/0171070 A1 | 6/2016 | Hrle et al. | |
| 2016/0179754 A1 | 6/2016 | Borza et al. | |
| 2016/0253294 A1* | 9/2016 | Allen | G06F 17/2235 715/206 |
| 2016/0316038 A1 | 10/2016 | Jolfaei | |
| 2016/0335281 A1 | 11/2016 | Teodoresou et al. | |
| 2016/0335304 A1 | 11/2016 | Teodoresou et al. | |
| 2016/0335317 A1 | 11/2016 | Teodoresou et al. | |
| 2016/0335323 A1 | 11/2016 | Teodoresou et al. | |
| 2016/0335330 A1 | 11/2016 | Teodorescu et al. | |
| 2016/0335361 A1 | 11/2016 | Teodorescu et al. | |
| 2017/0032016 A1 | 2/2017 | Zinner et al. | |
| 2017/0161514 A1 | 6/2017 | Dettinger et al. | |
| 2017/0177677 A1 | 6/2017 | Wright et al. | |
| 2017/0185385 A1 | 6/2017 | Kent, IV et al. | |
| 2017/0192910 A1 | 7/2017 | Wright et al. | |
| 2017/0206229 A1 | 7/2017 | Caudy et al. | |
| 2017/0206256 A1 | 7/2017 | Tsirogiannis et al. | |
| 2017/0235794 A1 | 8/2017 | Wright et al. | |
| 2017/0235798 A1 | 8/2017 | Wright et al. | |
| 2017/0249350 A1 | 8/2017 | Wright et al. | |
| 2017/0270150 A1 | 9/2017 | Wright et al. | |
| 2017/0316046 A1 | 11/2017 | Caudy et al. | |
| 2017/0329740 A1 | 11/2017 | Crawford et al. | |
| 2017/0357708 A1 | 12/2017 | Ramachandran et al. | |
| 2017/0359415 A1 | 12/2017 | Venkatraman et al. | |
| 2018/0004796 A1 | 1/2018 | Kent, IV et al. | |
| 2018/0011891 A1 | 1/2018 | Wright et al. | |
| 2018/0137175 A1 | 5/2018 | Teodorescu et al. | |

FOREIGN PATENT DOCUMENTS

| | | |
|---|---|---|
| EP | 1198769 B1 | 6/2008 |
| EP | 2199961 A1 | 6/2010 |
| EP | 2423816 A1 | 2/2012 |
| EP | 2743839 A1 | 6/2014 |
| GB | 2397906 A | 8/2004 |
| RU | 2421798 | 6/2011 |
| WO | 2000000879 A2 | 1/2000 |
| WO | 2001079964 A2 | 10/2001 |
| WO | 2011120161 A1 | 10/2011 |
| WO | 2012136627 A1 | 10/2012 |
| WO | 2014026220 A1 | 2/2014 |
| WO | 2014143208 A1 | 9/2014 |
| WO | 2016183563 A1 | 11/2016 |

OTHER PUBLICATIONS

Windows PowerShell Blog (Intellisense in Windows PowerShell ISE 3.0, by PowerShell Team; Date of Publication: Jun. 12, 2012, pp. 1-6 (Year: 2012).*
Brien Posey, "How to Combine PowerShell Cmdlets", Jun. 14, 2013 Redmond the Independent Voice of the Microsoft Community (Year: 2013).*
International Search Report and Written Opinion dated Aug. 18, 2016, in International Appln. No. PCT/US2016/032605 filed May 14, 2016.
International Search Report and Written Opinion dated Aug. 25, 2016, in International Appln. No. PCT/US2016/032590 filed May 14, 2016.
International Search Report and Written Opinion dated Aug. 25, 2016, in International Appln. No. PCT/US2016/032592 filed May 14, 2016.
International Search Report and Written Opinion dated Aug. 4, 2016, in International Appln. No. PCT/US2016/032581 filed May 14, 2016.
International Search Report and Written Opinion dated Jul. 28, 2016, in International Appln. No. PCT/US2016/032586 filed May 14, 2016.
International Search Report and Written Opinion dated Jul. 28, 2016, in International Appln. No. PCT/US2016/032587 filed May 14, 2016.
International Search Report and Written Opinion dated Jul. 28, 2016, in International Appln. No. PCT/US2016/032589 filed May 14, 2016.
International Search Report and Written Opinion dated Sep. 1, 2016, in International Appln. No. PCT/US2016/032596 filed May 14, 2016.
International Search Report and Written Opinion dated Sep. 1, 2016, in International Appln. No. PCT/US2016/032598 filed May 14, 2016.
International Search Report and Written Opinion dated Sep. 1, 2016, in International Appln. No. PCT/US2016/032601 filed May 14, 2016.
International Search Report and Written Opinion dated Sep. 1, 2016, in International Appln. No. PCT/US2016/032602 filed May 14, 2016.
International Search Report and Written Opinion dated Sep. 1, 2016, in International Appln. No. PCT/US2016/032607 filed May 14, 2016.
International Search Report and Written Opinion dated Sep. 15, 2016, in International Appln. No. PCT/US2016/032591 filed May 14, 2016.
International Search Report and Written Opinion dated Sep. 15, 2016, in International Appln. No. PCT/US2016/032594 filed May 14, 2016.
International Search Report and Written Opinion dated Sep. 15, 2016, in International Appln. No. PCT/US2016/032600 filed May 14, 2016.
International Search Report and Written Opinion dated Sep. 29, 2016, in International Appln. No. PCT/US2016/032595 filed May 14, 2016.
International Search Report and Written Opinion dated Sep. 29, 2016, in International Appln. No. PCT/US2016/032606 filed May 14, 2016.
International Search Report and Written Opinion dated Sep. 8, 2016, in International Appln. No. PCT/US2016/032603 filed May 14, 2016.
International Search Report and Written Opinion dated Sep. 8, 2016, in International Appln. No. PCT/US2016/032604 filed May 14, 2016.
Jellema, Lucas. "Implementing Cell Highlighting in JSF-based Rich Enterprise Apps (Part 1)", dated Nov. 2008. Retrieved from http://www.oracle.com/technetwork/articles/adf/jellema-adfcellhighlighting-087850.html (last accessed Jun. 16, 2016).
Lou, Yuan. "A Multi-Agent Decision Support System for Stock Trading", IEEE Network, Jan./Feb. 2002. Retreived from http://www.reading.ac.uk/AcaDepts/si/sisweb13/ais/papers/journal12-A%20multi-agent%20Framework.pdf.
Mallet, "Relational Database Support for Spatio-Temporal Data", Technical Report TR 04-21, Sep. 2004, University of Alberta, Department of Computing Science.
Mariyappan, Balakrishnan. "10 Useful Linux Bash_Completion Complete Command Examples (Bash Command Line Completion on Steroids)", dated Dec. 2, 2013. Retrieved from http://www.thegeekstuff.com/2013/12/bash-completion-complete/ (last accessed Jun. 16, 2016).
Murray, Derek G. et al. "Naiad: a timely dataflow system." SOSP '13 Proceedings of the Twenty-Fourth ACM Symposium on Operating Systems Principles. pp. 439-455. Nov. 2013.
Non-final Office Action dated Apr. 19, 2017, in U.S. Appl. No. 15/154,974.
Non-final Office Action dated Aug. 12, 2016, in U.S. Appl. No. 15/155,001.
Non-final Office Action dated Aug. 14, 2017, in U.S. Appl. No. 15/464,314.
Non-final Office Action dated Aug. 16, 2016, in U.S. Appl. No. 15/154,993.
Non-final Office Action dated Aug. 19, 2016, in U.S. Appl. No. 15/154,991.
Non-final Office Action dated Aug. 25, 2016, in U.S. Appl. No. 15/154,980.

(56) References Cited

OTHER PUBLICATIONS

Non-final Office Action dated Aug. 26, 2016, in U.S. Appl. No. 15/154,995.
Non-final Office Action dated Aug. 8, 2016, in U.S. Appl. No. 15/154,983.
Non-final Office Action dated Aug. 8, 2016, in U.S. Appl. No. 15/154,985.
Non-final Office Action dated Dec. 13, 2017, in U.S. Appl. No. 15/608,963.
Non-final Office Action dated Feb. 8, 2017, in U.S. Appl. No. 15/154,997.
Non-final Office Action dated Jul. 27, 2017, in U.S. Appl. No. 15/154,995.
Non-final Office Action dated Mar. 2, 2017, in U.S. Appl. No. 15/154,984.
Non-final Office Action dated Nov. 15, 2017, in U.S. Appl. No. 15/654,461.
Non-final Office Action dated Nov. 17, 2016, in U.S. Appl. No. 15/154,999.
Non-final Office Action dated Nov. 21, 2017, in U.S. Appl. No. 15/155,005.
Non-final Office Action dated Nov. 30, 2017, in U.S. Appl. No. 15/155,012.
Non-final Office Action dated Oct. 13, 2016, in U.S. Appl. No. 15/155,009.
Non-final Office Action dated Oct. 27, 2016, in U.S. Appl. No. 15/155,006.
Non-final Office Action dated Oct. 5, 2017, in U.S. Appl. No. 15/428,145.
Non-final Office Action dated Oct. 7, 2016, in U.S. Appl. No. 15/154,998.
Non-final Office Action dated Sep. 1, 2016, in U.S. Appl. No. 15/154,979.
Non-final Office Action dated Sep. 1, 2016, in U.S. Appl. No. 15/155,011.
Non-final Office Action dated Sep. 1, 2016, in U.S. Appl. No. 15/155,012.
Non-final Office Action dated Sep. 14, 2016, in U.S. Appl. No. 15/154,984.
Non-final Office Action dated Sep. 16, 2016, in U.S. Appl. No. 15/154,988.
Non-final Office Action dated Sep. 22, 2016, in U.S. Appl. No. 15/154,987.
Non-final Office Action dated Sep. 26, 2016, in U.S. Appl. No. 15/155,005.
Non-final Office Action dated Sep. 29, 2016, in U.S. Appl. No. 15/154,990.
Non-final Office Action dated Sep. 8, 2016, in U.S. Appl. No. 15/154,975.
Non-final Office Action dated Sep. 9, 2016, in U.S. Appl. No. 15/154,996.
Non-final Office Action dated Sep. 9, 2016, in U.S. Appl. No. 15/155,010.
Notice of Allowance dated Dec. 19, 2016, in U.S. Appl. No. 15/155,001.
Notice of Allowance dated Dec. 22, 2016, in U.S. Appl. No. 15/155,011.
Notice of Allowance dated Dec. 7, 2016, in U.S. Appl. No. 15/154,985.
Notice of Allowance dated Feb. 1, 2017, in U.S. Appl. No. 15/154,988.
Notice of Allowance dated Feb. 14, 2017, in U.S. Appl. No. 15/154,979.
Notice of Allowance dated Feb. 28, 2017, in U.S. Appl. No. 15/154,990.
Notice of Allowance dated Jan. 30, 2017, in U.S. Appl. No. 15/154,987.
Notice of Allowance dated Jul. 28, 2017, in U.S. Appl. No. 15/155,009.
Notice of Allowance dated Jun. 19, 2017, in U.S. Appl. No. 15/154,980.
Notice of Allowance dated Jun. 20, 2017, in U.S. Appl. No. 15/154,975.
Notice of Allowance dated Mar. 2, 2017, in U.S. Appl. No. 15/154,998.
Notice of Allowance dated Mar. 31, 2017, in U.S. Appl. No. 15/154,998.
Notice of Allowance dated May 10, 2017, in U.S. Appl. No. 15/154,988.
Notice of Allowance dated Nov. 17, 2016, in U.S. Appl. No. 15/154,991.
Notice of Allowance dated Nov. 17, 2017, in U.S. Appl. No. 15/154,993.
Notice of Allowance dated Nov. 21, 2016, in U.S. Appl. No. 15/154,983.
Notice of Allowance dated Nov. 8, 2016, in U.S. Appl. No. 15/155,007.
Notice of Allowance dated Oct. 11, 2016, in U.S. Appl. No. 15/155,007.
Notice of Allowance dated Oct. 21, 2016, in U.S. Appl. No. 15/154,999.
Notice of Allowance dated Oct. 6, 2017, in U.S. Appl. No. 15/610,162.
Palpanas, Themistoklis et al. "Incremental Maintenance for Non-Distributive Aggregate Functions", Proceedings of the 28th VLDB Conference, 2002. Retreived from http://www.vldb.org/conf/2002/S22P04.pdf.
PowerShell Team, Intellisense in Windows PowerShell ISE 3.0, dated Jun. 12, 2012, Windows PowerShell Blog, pp. 1-6 Retrieved: https://biogs.msdn.microsoft.com/powershell/2012/06/12/intellisense-in-windows-powershell-ise-3-0/.
Smith, Ian. "Guide to Using SQL: Computed and Automatic Columns." Rdb Jornal, dated Sep. 2008, retrieved Aug. 15, 2016, retrieved from the Internet <URL: http://www.oracle.com/technetwork/products/rdb/automatic-columns-132042.pdf>.
Wes McKinney & PyData Development Team. "pandas: powerful Python data analysis toolkit, Release 0.16.1" Dated May 11, 2015. Retrieved from: http://pandas.pydata.org/pandas-docs/version/0.16.1/index.html.
Wes McKinney & PyData Development Team. "pandas: powerful Python data analysis toolkit, Release 0.18.1" Dated May 3, 2016. Retrieved from: http://pandas.pydata.org/pandas-docs/version/0.18.1/index.html.
Wu, Buwen et al. "Scalable SPARQL Querying using Path Partitioning", 31st IEEE International Conference on Data Engineering (ICDE 2015), Seoul, Korea, Apr. 13-17, 2015. Retreived from http://imada.sdu.dk/~zhou/papers/icde2015.pdf.
Advisory Action dated Dec. 21, 2017, in U.S. Appl. No. 15/154,984.
Breitbart, Update Propagation Protocols for Replicated Databases, SIGMOD '99 Philadelphia PA, 1999, pp. 97-108.
Final Office Action dated Dec. 29, 2017, in U.S. Appl. No. 15/154,974.
Final Office Action dated Jun. 18, 2018, in U.S. Appl. No. 15/155,005.
Final Office Action dated May 18, 2018, in U.S. Appl. No. 15/654,461.
Kramer, The Combining DAG: A Technique for Parallel Data Flow Analysis, IEEE Transactions on Parallel and Distributed Systems, vol. 5, No. 8, Aug. 1994, pp. 805-813.
Non-final Office Action dated Apr. 12, 2018, in U.S. Appl. No. 15/154,997.
Non-final Office Action dated Apr. 23, 2018, in U.S. Appl. No. 15/813,127.
Non-final Office Action dated Apr. 5, 2018, in U.S. Appl. No. 15/154,984.
Non-final Office Action dated Dec. 28, 2017, in U.S. Appl. No. 15/154,996.
Non-final Office Action dated Feb. 12, 2018, in U.S. Appl. No. 15/466,836.
Non-final Office Action dated Feb. 15, 2018, in U.S. Appl. No. 15/813,112.
Non-final Office Action dated Feb. 28, 2018, in U.S. Appl. No. 15/813,119.
Non-final Office Action dated Jan. 4, 2018, in U.S. Appl. No. 15/583,777.
Non-final Office Action dated Jun. 29, 2018, in U.S. Appl. No. 15/154,974.

(56) References Cited

OTHER PUBLICATIONS

Non-final Office Action dated Jun. 8, 2018, in U.S. Appl. No. 15/452,574.
Non-final Office Action dated Mar. 20, 2018, in U.S. Appl. No. 15/155,006.
Notice of Allowance dated Apr. 30, 2018, in U.S. Appl. No. 15/155,012.
Notice of Allowance dated Feb. 12, 2018, in U.S. Appl. No. 15/813,142.
Notice of Allowance dated Feb. 26, 2018, in U.S. Appl. No. 15/428,145.
Notice of Allowance dated Jul. 11, 2018, in U.S. Appl. No. 15/154,995.
Notice of Allowance dated Mar. 1, 2018, in U.S. Appl. No. 15/464,314.
Notice of Allowance dated May 4, 2018, in U.S. Appl. No. 15/897,547.
"About Entering Commands in the Command Window", dated Dec. 16, 2015. Retrieved from https://knowledge.autodesk.com/support/autocad/learn-explore/caas/CloudHelp/cloudhelp/2016/ENU/AutoCAD-Core/files/GUID-BB0C3E79-66AF-4557-9140-D31B4CF3C9CF-htm.html (last accessed Jun. 16, 2016).
"Change Data Capture", Oracle Database Online Documentation 11g Release 1 (11.1), dated Apr. 5, 2016. Retrieved from https://web.archive.org/web/20160405032625/http://docs.oracle.com/cd/B28359_01/server.111/b28313/cdc.htm.
"Chapter 24. Query access plans", Tuning Database Performance, DB2 Version 9.5 for Linux, UNIX, and Windows, pp. 301-462, dated Dec. 2010. Retreived from http://public.dhe.ibm.com/ps/products/db2/info/vr95/pdf/en_US/DB2PerfTuneTroubleshoot-db2d3e953.pdf.
"GNU Emacs Manual", dated Apr. 15, 2016, pp. 43-47. Retrieved from https://web.archive.org/web/20160415175915/http://www.gnu.org/software/emacs/manual/html/mono/emacs.html.
"Google Protocol RPC Library Overview", dated Apr. 27, 2016. Retrieved from https://cloud.google.com/appengine/docs/python/tools/protorpc/ (last accessed Jun. 16, 2016).
"IBM—What is HBase?", dated Sep. 6, 2015. Retrieved from https://web.archive.org/web/20150906022050/http://www-01.ibm.com/software/data/infosphere/hadoop/hbase/.
"IBM Informix TimeSeries data management", dated Jan. 18, 2016. Retrieved from https://web.archive.org/web/20160118072141/http://www-01.ibm.com/software/data/informix/timeseries/.
"IBM InfoSphere BigInsights 3.0.0—Importing data from and exporting data to DB2 by using Sqoop", dated Jan. 15, 2015. Retrieved from https://web.archive.org/web/20150115034058/http://www-01.ibm.com/support/knowledgecenter/SSPT3X_3.0.0/com.ibm.swg.im.infosphere.biginsights.import.doc/doc/data_warehouse_sqoop.html.
"Maximize Data Value with Very Large Database Management by SAP Sybase IQ", dated 2013. Retrieved from http://www.sap.com/bin/sapcom/en_us/downloadasset.2013-06-jun-11-11.maximize-data-value-with-very-large-database-management-by-sap-sybase-iq-pdf.html.
"Microsoft Azure—Managing Access Control Lists (ACLs) for Endpoints by using PowerShell", dated Nov. 12, 2014. Retrieved from https://web.archive.org/web/20150110170715/http://msdn.microsoft.com/en-us/library/azure/dn376543.aspx.
"Oracle Big Data Appliance—Perfect Balance Java API", dated Sep. 20, 2015. Retrieved from https://web.archive.org/web/20131220040005/http://docs.oracle.com/cd/E41604_01/doc.22/e41667/toc.htm.
"Oracle Big Data Appliance—X5-2", dated Sep. 6, 2015. Retrieved from https://web.archive.org/web/20150906185409/http://www.oracle.com/technetwork/database/bigdata-appliance/overview/bigdataappliance-datasheet-1883358.pdf.
"Oracle Big Data Appliance Software User's Guide", dated Feb. 2015. Retrieved from https://docs.oracle.com/cd/E55905_01/doc.40/e55814.pdf.

"SAP HANA Administration Guide", dated Mar. 29, 2016, pp. 290-294. Retrieved from https://web.archive.org/web/20160417053656/http://help.sap.com/hana/SAP_HANA_Administration_Guide_en.pdf.
"Sophia Database—Architecture", dated Jan. 18, 2016. Retrieved from https://web.archive.org/web/20160118052919/http://sphia.org/architecture.html.
"Tracking Data Changes", SQL Server 2008 R2, dated Sep. 22, 2015. Retrieved from https://web.archive.org/web/20150922000614/https://technet.microsoft.com/en-us/library/bb933994(v=sql.105).aspx.
"Use Formula AutoComplete", dated 2010. Retrieved from https://support.office.com/en-us/article/Use-Formula-AutoComplete-c7c46fa6-3a94-4150-a2f7-34140c1ee4d9 (last accessed Jun. 16, 2016).
Adelfio et al. "Schema Extraction for Tabular Data on the Web", Proceedings of the VLDB Endowment, vol. 6, No. 6. Apr. 2013. Retrieved from http://www.cs.umd.edu/~hjs/pubs/spreadsheets-vldb13.pdf.
Advisory Action dated Apr. 19, 2017, in U.S. Appl. No. 15/154,999.
Advisory Action dated Apr. 20, 2017, in U.S. Appl. No. 15/154,980.
Advisory Action dated Apr. 6, 2017, in U.S. Appl. No. 15/154,995.
Advisory Action dated Mar. 31, 2017, in U.S. Appl. No. 15/154,996.
Advisory Action dated May 3, 2017, in U.S. Appl. No. 15/154,993.
Borror, Jefferey A. "Q for Mortals 2.0", dated Nov. 1, 2011 Retrieved from http://code.kx.com/wiki/JB:QforMortals2/contents.
Cheusheva, Svetlana. "How to change the row color based on a cell's value in Excel", dated Oct. 29, 2013. Retrieved from https://www.ablebits.com/office-addins-blog/2013/10/29/excel-change-row-background-color/ (last accessed Jun. 16, 2016).
Corrected Notice of Allowability dated Aug. 9, 2017, in U.S. Appl. No. 15/154,980.
Corrected Notice of Allowability dated Jul. 31, 2017, in U.S. Appl. No. 15/154,999.
Corrected Notice of Allowability dated Mar. 10, 2017, in U.S. Appl. No. 15/154,979.
Corrected Notice of Allowability dated Oct. 26, 2017, in U.S. Appl. No. 15/610,162.
Decision on Pre-Appeal Conference Request mailed Nov. 20, 2017, in U.S. Appl. No. 15/154,997.
Ex Parte Quayle Action mailed Aug. 8, 2016, in U.S. Appl. No. 15/154,999.
Final Office Action dated Apr. 10, 2017, in U.S. Appl. No. 15/155,006.
Final Office Action dated Dec. 19, 2016, in U.S. Appl. No. 15/154,995.
Final Office Action dated Feb. 24, 2017, in U.S. Appl. No. 15/154,993.
Final Office Action dated Jan. 27, 2017, in U.S. Appl. No. 15/154,980.
Final Office Action dated Jan. 31, 2017, in U.S. Appl. No. 15/154,996.
Final Office Action dated Jul. 27, 2017, in U.S. Appl. No. 15/154,993.
Final Office Action dated Jun. 23, 2017, in U.S. Appl. No. 15/154,997.
Final Office Action dated Mar. 1, 2017, in U.S. Appl. No. 15/154,975.
Final Office Action dated Mar. 13, 2017, in U.S. Appl. No. 15/155,012.
Final Office Action dated Mar. 31, 2017, in U.S. Appl. No. 15/155,005.
Final Office Action dated May 15, 2017, in U.S. Appl. No. 15/155,010.
Final Office Action dated May 4, 2017, in U.S. Appl. No. 15/155,009.
Gai, Lei et al. "An Efficient Summary Graph Driven Method for RDF Query Processing", dated Oct. 27, 2015. Retreived from http://arxiv.org/pdf/1510.07749.pdf.
International Search Report and Written Opinion dated Aug. 18, 2016, in International Appln. No. PCT/US2016/032582 filed May 14, 2016.
International Search Report and Written Opinion dated Aug. 18, 2016, in International Appln. No. PCT/US2016/032584 filed May 14, 2016.
International Search Report and Written Opinion dated Aug. 18, 2016, in International Appln. No. PCT/US2016/032588 filed May 14, 2016.
International Search Report and Written Opinion dated Aug. 18, 2016, in International Appln. No. PCT/US2016/032593 filed May 14, 2016.
International Search Report and Written Opinion dated Aug. 18, 2016, in International Appln. No. PCT/US2016/032597 filed May 14, 2016.

(56) References Cited

OTHER PUBLICATIONS

International Search Report and Written Opinion dated Aug. 18, 2016, in International Appln. No. PCT/US2016/032599 filed May 14, 2016.
Final Office Action dated Aug. 2, 2018, in U.S. Appl. No. 15/154,996.
Final Office Action dated Aug. 28, 2018, in U.S. Appl. No. 15/813,119.
Final Office Action dated Oct. 1, 2018, in U.S. Appl. No. 15/154,993.
Non-final Office Action dated Aug. 10, 2018, in U.S. Appl. No. 16/004,578.
Notice of Allowance dated Sep. 11, 2018, in U.S. Appl. No. 15/608,963.
Maria Azbel, How too hide and group columns in Excel AbleBits (2014), https://www.ablebits.com/office-addins-blog/2014/08/06/excel-hide-columns/ (last visited Jan. 18, 2019).
Mark Dodge & Craig Stinson, Microsoft Excel 2010 inside out (2011).
Svetlana Cheusheve, Excel formulas for conditional formatting based on another cell AbleBits (2014), https://www.ablebits.com/office-addins-blog/2014/06/10/excel-conditional-formatting-formulas/comment-page-6/ (last visited Jan. 14, 2019).
Hartle, Thom, Conditional Formatting in Excel using CQG's RTD Bate Function (2011), http://news.cqg.com/blogs/exce/l2011/05/conditional-formatting-excel-using-cqgs-rtd-bate-function (last visited Apr. 3, 2019).

* cited by examiner

400 Computer Console with Command Line Interface

```
402 – Console

> t=db.t2("S <tab>     ← 404

SyncCalc  SystemX  SystemY  SystemIndex     ← 406
```

FIG. 4A

400 Computer Console with Command Line Interface

```
402 – Console

> t=db.t2("S <tab>     ← 404

SyncCalc  SystemX  SystemY  SystemIndex    ← 406

> t=db.t2("Sys <tab>   ← 408
> t=db.t2("System      ← 410
```

FIG. 4B

400 Computer Console with Command Line Interface

402 -- Console

> t=db.t2("S <tab>  ⟵ 404

SyncCalc  SystemX  SystemY  SystemIndex  ⟵ 406

> t=db.t2("Sys <tab>  ⟵ 408
> t=db.t2("System <tab>  ⟵ 412

SystemX  SystemY  SystemIndex  ⟵ 414

FIG. 4C

400 Computer Console with Command Line Interface

```
402 – Console

> t=db.t2("S <tab>    ← 404

SyncCalc  SystemX  SystemY  SystemIndex    ← 406

> t=db.t2("Sys <tab>   ← 408
> t=db.t2("System <tab>   ← 412

SystemX  SystemY  SystemIndex   ← 414
                                ← 416

> t=db.t2("SystemIndex"   ← 418
```

FIG. 4D

400 Computer Console with Command Line Interface

```
402 – Console

> t=db.t2("S <tab>    ← 404

SyncCalc  SystemX  SystemY  SystemIndex    ← 406

> t=db.t2("Sys <tab>    ← 408

> t=db.t2("System <tab>    ← 412

SystemX  SystemY  SystemIndex    ← 414
                          ← 416

> t=db.t2("SystemIndex"    ← 418

> t=db.t2("SystemIndex").Wh    ← 420
<tab>

> t=db.t2("SystemIndex").Where    ← 422
```

FIG. 4E

400 Computer Console with Command Line Interface

```
402 – Console

> t=db.t2("S <tab>                    ~ 404
SyncCalc  SystemX  SystemY  SystemIndex    ~ 406

> t=db.t2("Sys <tab>    ~ 408
> t=db.t2("System <tab>    ~ 412
SystemX  SystemY  SystemIndex    ~ 414
                                 ~ 416

> t=db.t2("SystemIndex"    ~ 418

> t=db.t2("SystemIndex").Wh    ~ 420
<tab>
> t=db.t2("SystemIndex").Where    ~ 422

> t=db.t2("SystemIndex").Where("A>100")    ~ 424

> t=db.t2("SystemIndex").Where("A>100") <ENTER>    ~ 426
```

FIG. 4F

COMPUTER ASSISTED COMPLETION OF HYPERLINK COMMAND SEGMENTS

This application claims the benefit of U.S. Provisional Application No. 62/161,813, entitled "Computer Data System" and filed on May 14, 2015, which is incorporated herein by reference in its entirety.

Embodiments relate generally to computer console command line interface systems, and more particularly, to methods, systems and computer readable media for assisting the completion of hyperlink command segments in a computer console command line interface.

Many computer system user consoles require commands to be typed into a command line interface. User input for complex commands can be very long and error prone. Long complex commands can contain numerous parameters with special characters after the initial command segment. It is not uncommon for a user to type a long command string with many parameters followed by pressing the enter key only for system to display an error on the console screen informing the user that the command was not executed because of a syntax error. At that point, the user must determine where in the command line the error was made and retype the long command yet again. Also, in a system that has hundreds of possible command segment choices and associated parameter combinations, it can be difficult for a user to remember the best available command and parameter choices. A user may need to generate a new command when the user may not know or remember all of the necessary syntax or parameters. Without any prompting of choices, the user may form and submit a command and parameters that are not optimal for the desired task or results. Automatic completion of a full command with the last used command and parameters that contain the same beginning characters is not a remedy because numerous commands with the same root command segment may exist and the full command chosen by the system may not be the command and parameters preferred or desired by the user.

Embodiments were conceived in light of the above mentioned needs, problems and/or limitations, among other things.

Some implementations can include a system for computer processor assisted completion of hyperlink command segments comprising one or more hardware processors, a computer console coupled to the one or more hardware processors, a computer readable data storage device coupled to the one or more hardware processors, the computer readable data storage device having stored thereon software instructions that, when executed by the one or more hardware processors, cause the one or more hardware processors to perform operations. The operations can include (a) using the computer processor for monitoring for input in the computer console command line interface. The operations can also include (b) receiving by the computer processor one or more characters input into the computer console command line interface. The operations can include (c) receiving by the computer processor a first designated hot key character input into the computer console command line interface. The operations can further include (d) upon receiving the first designated hot key character, using the computer processor for searching potential command line completion sources in a computer memory for segment matches with the received characters input into the computer console command line interface. The operations can include (e) if only a common segment match is found, making the common segment match a selection. The operations can also include (f) if only a common segment match is found, displaying the common segment match in the computer console command line interface and proceeding to step (k). The operations can further include (g) if more than one common segment matches are found, displaying as one or more hyperlinks in proximity to the computer console command line interface any segment matches found in the potential command line completion sources. The operations can include (h) receiving by the computer processor a selection of one of the one or more hyperlinks in proximity to the computer console command line interface or one or more characters. The operations can also include (i) if the selection of one of the one or more hyperlinks in proximity to the computer console command line interface is received, displaying the selection of one of the one or more hyperlinks in proximity to the computer console command line interface in the computer console command line interface. The operations can further include (j) if one or more characters are received, displaying the one or more characters in the computer console command line interface and proceeding to step (l) below. The operations can include (k) using the computer processor for monitoring for character input into the computer console command line interface. The operations can also include (l) if a character is received that is not a second designated hot key character repeat steps (a) through (j). The operations can further include (m) if the second designated hot key character is received, execute the command segments using the computer processor.

The operations can include wherein potential command line completion sources include at least one source from a command history, a command syntax file, a database name space source, and a table name source.

The operations can also include wherein the selection includes a cursor click operation.

The operations can also include wherein the designated hot key character includes a <tab> key character.

The operations can include wherein displaying as one or more hyperlinks in proximity to the computer console command line interface any segment matches found in the potential command line completion sources includes displaying an indicator if one or more additional hyperlinks are available off-screen.

Some implementations can include a method for computer processor assisted completion of hyperlink command segments comprising (a) using a computer processor for monitoring for input in a computer console command line interface. The method can also include (b) receiving by the computer processor one or more characters input into the computer console command line interface. The method can further include (c) receiving by the computer processor a first designated hot key character input into the computer console command line interface. The method can also include (d) upon receiving the first designated hot key character, using the computer processor for searching potential command line completion sources in a computer memory for segment matches with the received characters input into the computer console command line interface. The method can include (e) if only a common segment match is found, making the common segment match a selection. The method can also include (f) if only a common segment match is found, displaying the common segment match in the computer console command line interface and proceeding to step (k). The method can further include (g) if more than one common segment matches are found, displaying as one or more hyperlinks in proximity to the computer console command line interface any segment matches found in the potential command line completion sources. The method can also include (h) receiving by the computer processor a selection of one of the one or more hyperlinks in proximity to the computer console command line interface or one or more characters. The method can include (i) if the selection of one of the one or more hyperlinks in proximity to the computer console command line interface is received, displaying the selection of one of the one or more hyperlinks in proximity to the computer console command line interface in the computer console command line interface. The method can also include (j) if one or more characters are received, displaying the one or more characters in the computer console command line interface and proceeding to step (l). The method can include (k) using the computer processor for monitoring for character input into the computer console command line interface. The method can also include (l) if a character is received that is not a second designated hot key character repeat steps (a) through (j). The method can further include (m) if the second designated hot key character is received, execute the command segments using the computer processor.

The method can include wherein potential command line completion sources include at least one source from a command history, a command syntax file, a database name space source, and a table name source.

The method can also include wherein the selection includes a cursor click operation.

The method can include wherein the designated hot key character includes a <tab> key character.

The method can also include wherein displaying as one or more hyperlinks in proximity to the computer console command line interface any segment matches found in the potential command line completion sources includes displaying an indicator if one or more additional hyperlinks are available off-screen.

Some implementations can include a nontransitory computer readable medium having stored thereon software instructions that, when executed by one or more computer processors, cause the one or more processors to perform operations. The operations can include (a) using the one or more computer processors for monitoring for input in a computer console command line interface. The operations can also include (b) receiving by the one or more computer processors one or more characters input into the computer console command line interface. The operations can further include (c) receiving by the one or more computer processors a first designated hot key character input into the computer console command line interface. The operations can include (d) upon receiving the first designated hot key character, using the one or more computer processors for searching potential command line completion sources in a computer memory for segment matches with the received characters input into the computer console command line interface. The operations can include (e) if only a common segment match is found, making the common segment match a selection. The operations can also include (f) if only a common segment match is found, displaying the common segment match in the computer console command line interface and proceeding to step (k). The operations can further include (g) if more than one common segment matches are found, displaying as one or more hyperlinks in proximity to the computer console command line interface any segment matches found in the potential command line completion sources. The operations can also include (h) receiving by the computer processor a selection of one of the one or more hyperlinks in proximity to the computer console command line interface or one or more characters. The operations can include (i) if the selection of one of the one or more hyperlinks in proximity to the computer console command line interface is received, displaying the selection of one of the one or more hyperlinks in proximity to the computer console command line interface in the computer console command line interface. The operations can also include (j) if one or more characters are received, displaying the one or more characters in the computer console command line interface and proceeding to step (1). The operations can include (k) using the computer processor for monitoring for character input into the computer console command line interface. The operations can also include (l) if a character is received that is not a second designated hot key character repeat steps (a) through (j). The operations can further include (m) if the second designated hot key character is received, execute the command segments using the computer processor.

The operations can further include wherein potential command line completion sources include at least one source from a command history, a command syntax file, a database name space source, and a table name source.

The operations can also include wherein the selection includes a cursor click operation.

The operations can include wherein the designated hot key character includes a <tab> key character.

The operations can also include wherein displaying as one or more hyperlinks in proximity to the computer console command line interface any segment matches found in the potential command line completion sources includes displaying an indicator if one or more additional hyperlinks are available off-screen.

BRIEF DESCRIPTION OF THE DRAWINGS

FIG. 4A is a diagram of an example computer console with a command line interface interaction.

FIG. 4B is a diagram of an example computer console with a command line interface interaction.

FIG. 4C is a diagram of an example computer console with a command line interface interaction.

FIG. 4D is a diagram of an example computer console with a command line interface interaction.

FIG. 4E is a diagram of an example computer console with a command line interface interaction.

FIG. 4F is a diagram of an example computer console with a command line interface interaction.

DETAILED DESCRIPTION

Reference is made herein to the Java programming language, Java classes, Java bytecode and the Java Virtual Machine (JVM) for purposes of illustrating example implementations. It will be appreciated that implementations can include other programming languages (e.g., Groovy, Scala, R, Go, etc.), other programming language structures as an alternative to or in addition to Java classes (e.g., other language classes, objects, data structures, program units, code portions, script portions, etc.), other types of bytecode, object code and/or executable code, and/or other virtual machines or hardware implemented machines configured to execute a data system query.

Figure 1:
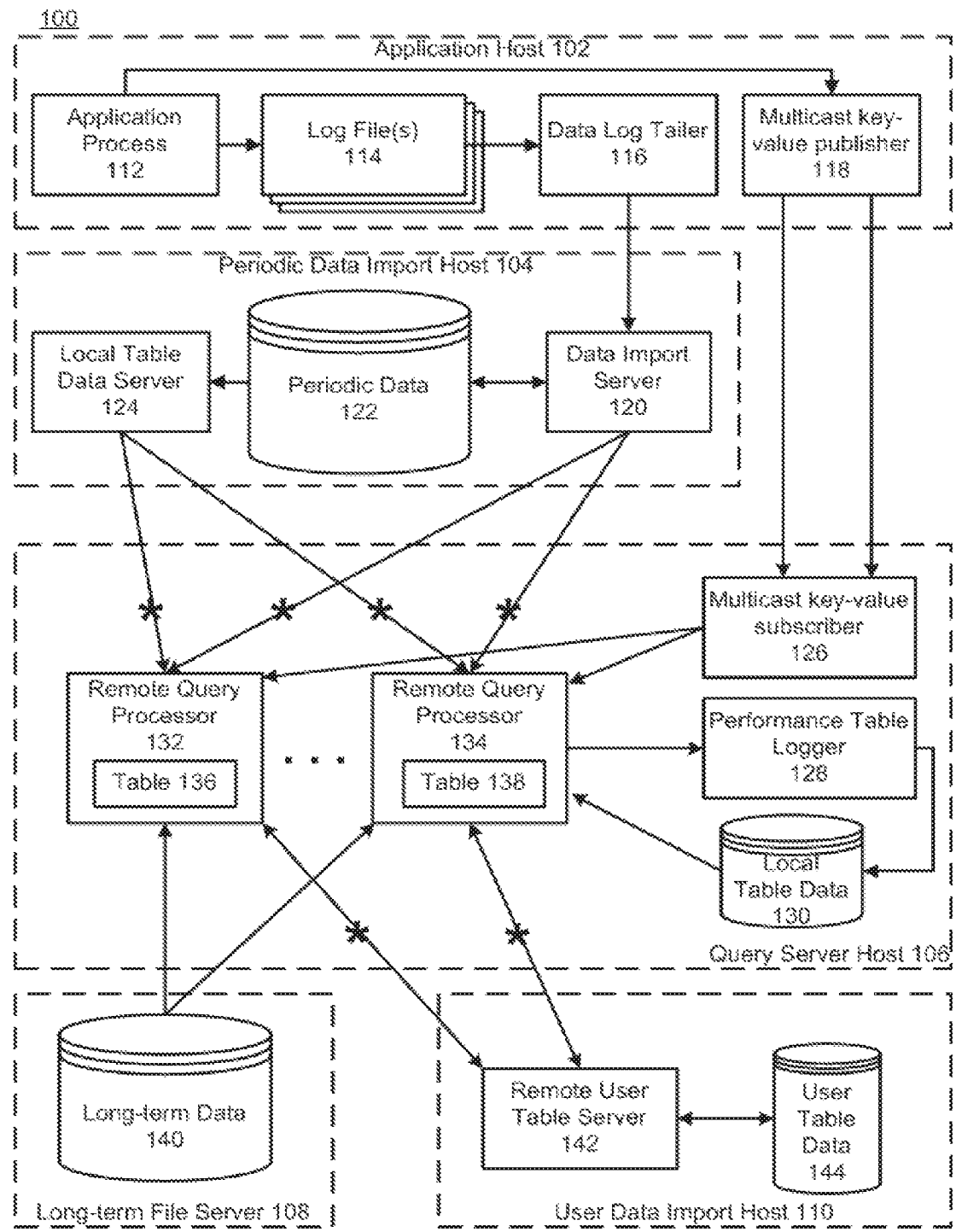
FIG. 1 is a diagram of an example computer data system showing an example data distribution configuration in accordance with some implementations.
Figure 2:
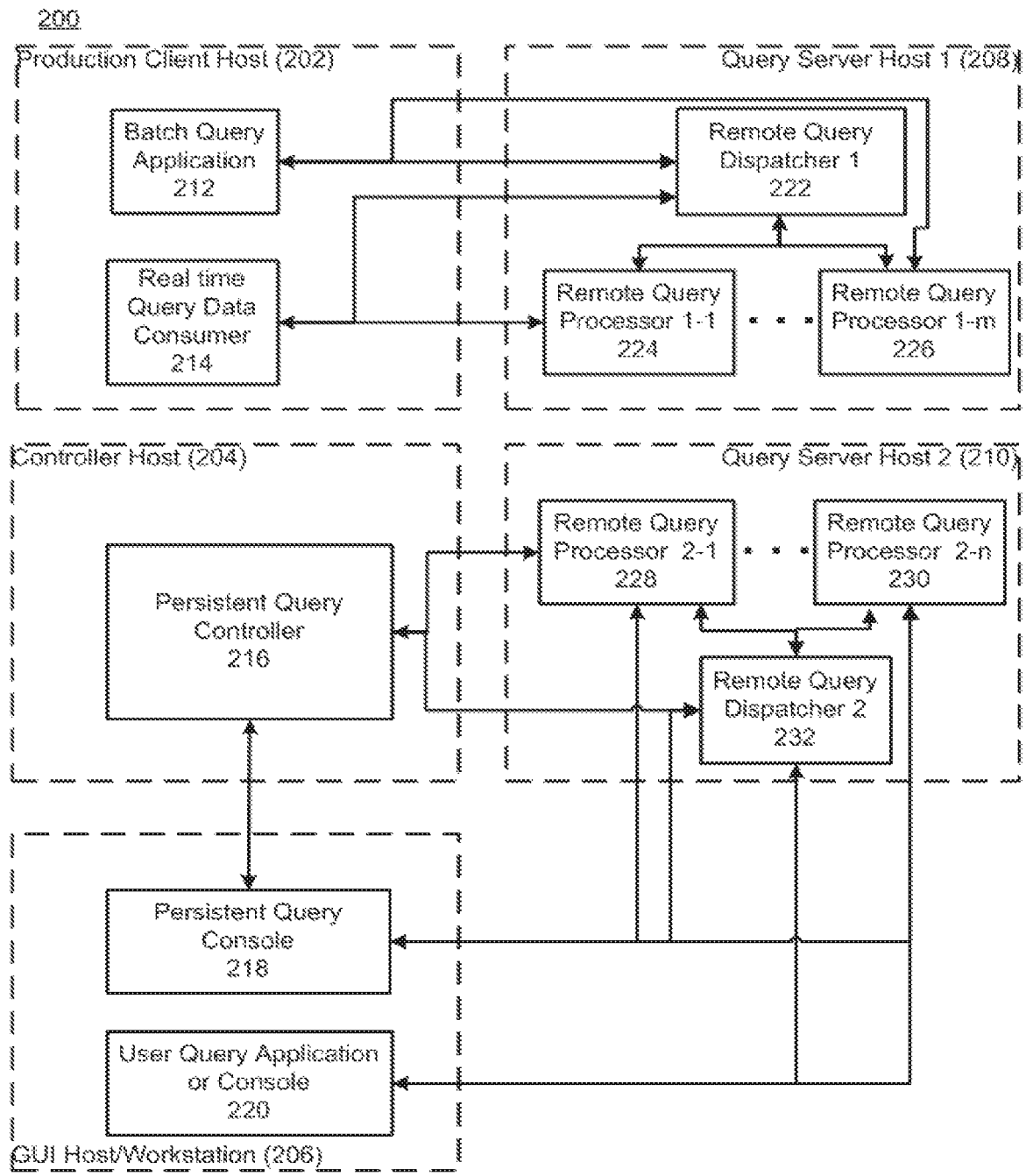
FIG. 2 is a diagram of an example computer data system showing an example administration/process control arrangement in accordance with some implementations.

FIG. 1 is a diagram of an example computer data system and network 100 showing an example data distribution configuration in accordance with some implementations. In particular, the system 100 includes an application host 102, a periodic data import host 104, a query server host 106, a long-term file server 108, and a user data import host 110. While tables are used as an example data object in the description below, it will be appreciated that the data system described herein can also process other data objects such as mathematical objects (e.g., a singular value decomposition of values in a given range of one or more rows and columns of a table), TableMap objects, etc. A TableMap object provides the ability to lookup a Table by some key. This key represents a unique value (or unique tuple of values) from the columns aggregated on in a byExternal( ) statement execution, for example. A TableMap object can be the result of a byExternal( ) statement executed as part of a query. It will also be appreciated that the configurations shown in FIGS. 1 and 2 are for illustration purposes and in a given implementation each data pool (or data store) may be directly attached or may be managed by a file server.

The application host 102 can include one or more application processes 112, one or more log files 114 (e.g., sequential, row-oriented log files), one or more data log tailers 116 and a multicast key-value publisher 118. The periodic data import host 104 can include a local table data server, direct or remote connection to a periodic table data store 122 (e.g., a column-oriented table data store) and a data import server 120. The query server host 106 can include a multicast key-value subscriber 126, a performance table logger 128, local table data store 130 and one or more remote query processors (132, 134) each accessing one or more respective tables (136, 138). The long-term file server 108 can include a long-term data store 140. The user data import host 110 can include a remote user table server 142 and a user table data store 144. Row-oriented log files and column-oriented table data stores are discussed herein for illustration purposes and are not intended to be limiting. It will be appreciated that log files and/or data stores may be configured in other ways. In general, any data stores discussed herein could be configured in a manner suitable for a contemplated implementation.

In operation, the input data application process 112 can be configured to receive input data from a source (e.g., a securities trading data source), apply schema-specified, generated code to format the logged data as it's being prepared for output to the log file 114 and store the received data in the sequential, row-oriented log file 114 via an optional data logging process. In some implementations, the data logging process can include a daemon, or background process task, that is configured to log raw input data received from the application process 112 to the sequential, row-oriented log files on disk and/or a shared memory queue (e.g., for sending data to the multicast publisher 118). Logging raw input data to log files can additionally serve to provide a backup copy of data that can be used in the event that downstream processing of the input data is halted or interrupted or otherwise becomes unreliable.

A data log tailer 116 can be configured to access the sequential, row-oriented log file(s) 114 to retrieve input data logged by the data logging process. In some implementations, the data log tailer 116 can be configured to perform strict byte reading and transmission (e.g., to the data import server 120). The data import server 120 can be configured to store the input data into one or more corresponding data stores such as the periodic table data store 122 in a column-oriented configuration. The periodic table data store 122 can be used to store data that is being received within a time period (e.g., a minute, an hour, a day, etc.) and which may be later processed and stored in a data store of the long-term file server 108. For example, the periodic table data store 122 can include a plurality of data servers configured to store periodic securities trading data according to one or more characteristics of the data (e.g., a data value such as security symbol, the data source such as a given trading exchange, etc.).

The data import server 120 can be configured to receive and store data into the periodic table data store 122 in such a way as to provide a consistent data presentation to other parts of the system. Providing/ensuring consistent data in this context can include, for example, recording logged data to a disk or memory, ensuring rows presented externally are available for consistent reading (e.g., to help ensure that if the system has part of a record, the system has all of the record without any errors), and preserving the order of records from a given data source. If data is presented to clients, such as a remote query processor (132, 134), then the data may be persisted in some fashion (e.g., written to disk).

The local table data server 124 can be configured to retrieve data stored in the periodic table data store 122 and provide the retrieved data to one or more remote query processors (132, 134) via an optional proxy.

The remote user table server (RUTS) 142 can include a centralized consistent data writer, as well as a data server that provides processors with consistent access to the data that it is responsible for managing. For example, users can provide input to the system by writing table data that is then consumed by query processors.

The remote query processors (132, 134) can use data from the data import server 120, local table data server 124 and/or from the long-term file server 108 to perform queries. The remote query processors (132, 134) can also receive data from the multicast key-value subscriber 126, which receives data from the multicast key-value publisher 118 in the application host 102. The performance table logger 128 can log performance information about each remote query processor and its respective queries into a local table data store 130. Further, the remote query processors can also read data from the RUTS, from local table data written by the performance logger, or from user table data read over NFS.

It will be appreciated that the configuration shown in FIG. 1 is a typical example configuration that may be somewhat idealized for illustration purposes. An actual configuration may include one or more of each server and/or host type. The hosts/servers shown in FIG. 1 (e.g., 102-110, 120, 124 and 142) may each be separate or two or more servers may be combined into one or more combined server systems. Data stores can include local/remote, shared/isolated and/or redundant. Any table data may flow through optional proxies indicated by an asterisk on certain connections to the remote query processors. Also, it will be appreciated that the term "periodic" is being used for illustration purposes and can include, but is not limited to, data that has been received within a given time period (e.g., millisecond, second, minute, hour, day, week, month, year, etc.) and which has not yet been stored to a long-term data store (e.g., 140).

FIG. 2 is a diagram of an example computer data system 200 showing an example administration/process control arrangement in accordance with some implementations. The system 200 includes a production client host 202, a controller host 204, a GUI host or workstation 206, and query server hosts 208 and 210. It will be appreciated that there may be one or more of each of 202-210 in a given implementation.

The production client host 202 can include a batch query application 212 (e.g., a query that is executed from a command line interface or the like) and a real time query data consumer process 214 (e.g., an application that connects to and listens to tables created from the execution of a separate query). The batch query application 212 and the real time query data consumer 214 can connect to a remote query dispatcher 222 and one or more remote query processors (224, 226) within the query server host 1 208.

The controller host 204 can include a persistent query controller 216 configured to connect to a remote query dispatcher 232 and one or more remote query processors 228-230. In some implementations, the persistent query controller 216 can serve as the "primary client" for persistent queries and can request remote query processors from dispatchers, and send instructions to start persistent queries. For example, a user can submit a query to 216, and 216 starts and runs the query every day. In another example, a securities trading strategy could be a persistent query. The persistent query controller can start the trading strategy query every morning before the market open, for instance. It will be appreciated that 216 can work on times other than days. In some implementations, the controller may require its own clients to request that queries be started, stopped, etc. This can be done manually, or by scheduled (e.g., cron) jobs. Some implementations can include "advanced scheduling" (e.g., auto-start/stop/restart, time-based repeat, etc.) within the controller.

The GUI/host workstation can include a user console 218 and a user query application 220. The user console 218 can be configured to connect to the persistent query controller 216. The user query application 220 can be configured to connect to one or more remote query dispatchers (e.g., 232) and one or more remote query processors (228, 230).

Figure 3:
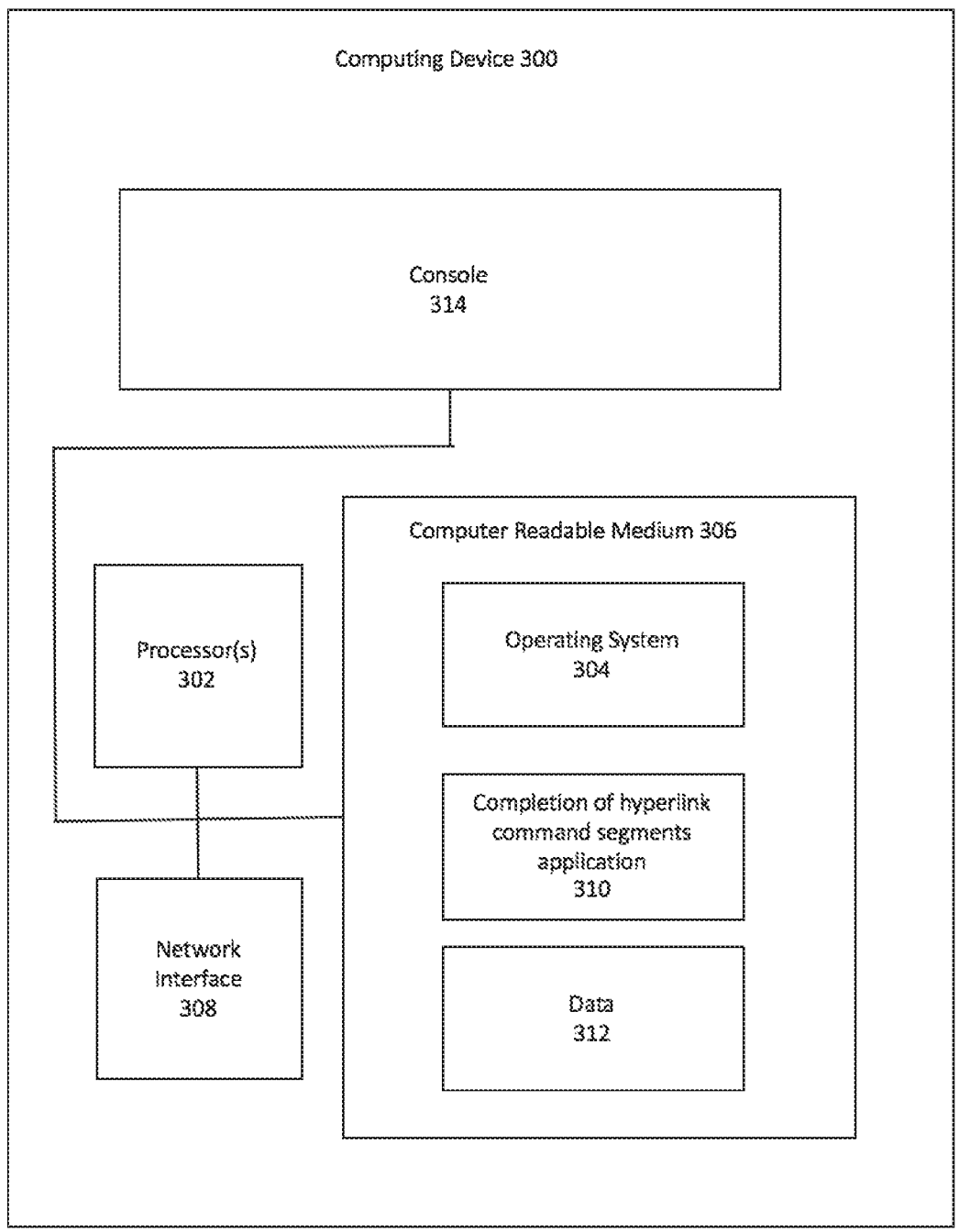
FIG. 3 is a diagram of an example computing device with a console configured for user input of commands into a command line interface.

FIG. 3 is a diagram of an example computing device 300 in accordance with at least one implementation. The computing device 300 includes one or more processors 302, operating system 304, computer readable medium 306, network interface 308, and a console 314. The memory 306 can include a completion of hyperlink command segments application 310 and a data section 312 (e.g., for storing ASTs, precompiled code, etc.).

In operation, the processor 302 may execute the application 310 stored in the memory 306. The application 310 can include software instructions that, when executed by the processor, cause the processor to perform operations for computer assisted completion of hyperlink command segments in accordance with the present disclosure (e.g., performing one or more of 502-520 described below).

The application program 310 can operate in conjunction with the data section 312, the operating system 304, and the console 314.

In general, some implementations can provide a system for assisting the completion of a user's partially or fully typed command segments that a user types into a command line interface. The system described herein monitors a user typing into a command line interface and when signaled by a user pressing a designated hot key, the system searches through possible command segment completion sources to find one or more matches that begin with the typed characters. For example, a user could type the first three letters of a command segment followed by pressing the <tab> key on the user's keyboard. The system can then respond by displaying to the user a lone match to the command segment or if more than one command segment match is found, all the command segments with the first three characters that match the user-typed three characters. The user can then accept one of the presented command segments with a cursor click on the hyperlinked command segment or type in more characters followed by pressing the designed hot key again to further limit the choices. The user can then repeat the process of typing a few characters followed by a designated hot key to add more command segments and parameter segments in order to create a full command string. Finally, the user can request that the system execute the displayed command string by pressing the <ENTER> key.

It will be appreciated that command segments that are not hyperlinked can also be chosen by a cursor click or other selection method.

Figure 4:
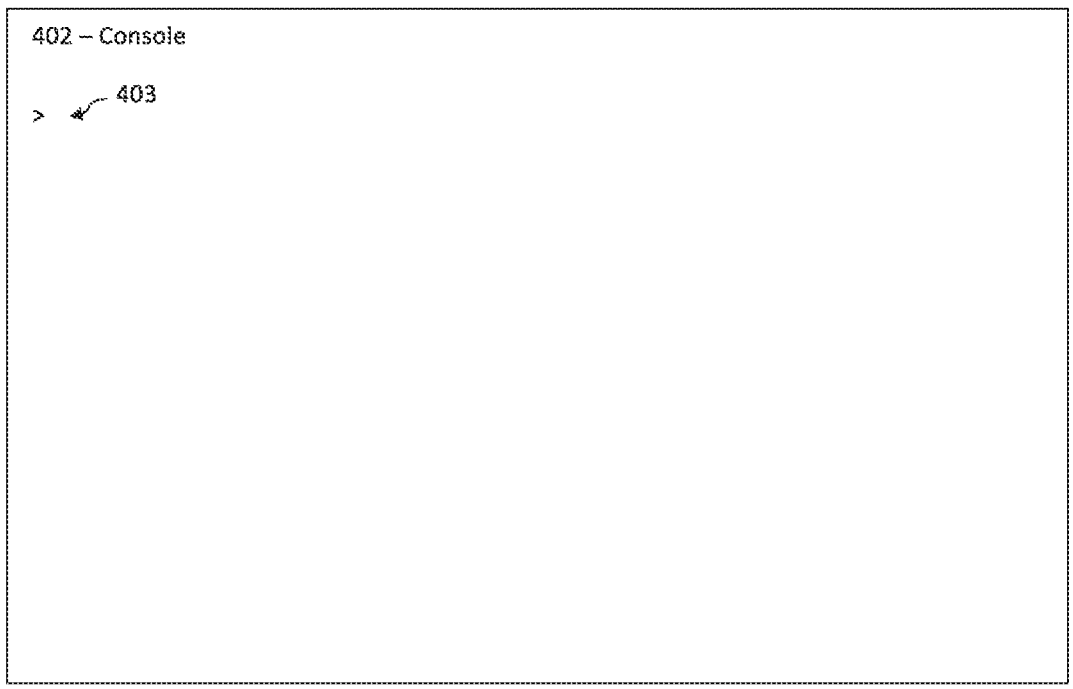
FIG. 4 is a diagram of an example computer console with a command line interface.

FIG. 4 is a diagram of an example computer console with a command line interface 400. The computer console 402 can provide a symbol such as a ">" designating a command line interface 403 available for a user to enter input.

It will be appreciated that a user can enter input through a variety of means including but not limited to a physical keyboard, hot keys, touch screen, touch screen with displayed keyboard, voice recognition, macros, cut and paste, and the like.

FIG. 4A is a diagram of an example computer console with a command line interface 400. In a continuation of an example from FIG. 4, a user can type in one or more characters into the command line interface followed by the user pressing a designated hot key, such as a <tab> key. For example, the user can type ">t=db.t2("S<tab> as shown at 404. In response, the system can search for all command segment matches to "S" and can display command segment matches (e.g., SyncCalc, SystemX SystemY Systemindex) to the console in the form of hyperlinks as shown at 406.

It will be appreciated that the user can choose to click on one of the command segment hyperlink choices (e.g., SyncCalc, SystemX SystemY SystemIndex) with a cursor or can choose to type more characters followed by pressing a <tab> key to narrow the command segment choices to only command segment choices with a "System" substring within the full segment string. Each of the choices (e.g., SyncCalc, SystemX SystemY SystemIndex) can be a hyperlink that when clicked on using a cursor or other pointing device, can cause the full segment string to be displayed in the command line interface for possible execution. For example, if a user clicks on the SystemX hyperlink, the resulting command line can be ">t=db.t2("SystemX". The user can then either continue typing in more characters to further define the command or add parameters or press <ENTER> to execute the command.

It will also be appreciated that if more command segment matches are found by the system than can be displayed on the console 402, the system can present an indicator of too many matches to display on the console screen along with a mechanism for displaying additional pages of matches. It will also be appreciated that the term command segment is not limit to only command syntax but also includes any term that can be added to a command line such as commands, parameters, tokens, variables, limitations, and the like.

FIG. 4B is a diagram of an example computer console with a command line interface 400. In a continuation of an example from FIG. 4A, a user can further narrow the displayed matches by typing more characters into the command line interface in order to add more letters to "S," such as "Sys," followed by pressing the <tab> key as shown at

408. Because there are only three matches in the example with "Sys" (SystemX SystemY SystemIndex) and all three matches have a common command segment of "System," the system completes the first portion of the command in the command line interface with "System, as shown at 410.

It will be appreciated that the system was able to determine that "System" should be displayed in the command line interface because all three matches (SystemX SystemY SystemIndex) to the user typed characters "Sys" have "System" as a common command segment stem. Accordingly, the system can deduce that the common portion, "System," must be part of the full command segment.

FIG. 4C is a diagram of an example computer console with a command line interface 400. In a continuation of an example from FIG. 4B, a user can press the <tab> key as shown at 412 after the "System" segment is written into the command line interface (FIG. 4B 410) by the system. Upon receiving the <tab> 412, the system can search for all matches to "System" and can display the matches SystemX SystemY SystemIndex) to the console in the form of hyperlinks as shown at 414.

FIG. 4D is a diagram of an example computer console with a command line interface 400. In a continuation of an example from FIG. 4C, a user can use a cursor 416 to click on one of the three presented choices (SystemX SystemY Systemindex) 414. Upon receiving the cursor click, the system can acknowledge the cursor click as a selection of a particular hyperlink such as the Systemindex hyperlink. The system can execute the hyperlink and complete the command segment with SystemIndex as shown at 418.

It will be appreciated that after the completion of the command segment a user can decide to either attempt to execute the command segment as a full command by pressing the <ENTER> key or add contiguously to the displayed command segment by typing one or more characters into the computer console command line interface after the displayed command segment.

FIG. 4E is a diagram of an example computer console with a command line interface 400. In a continuation of an example from FIG. 4D, a user can type one or more characters into the computer console command line interface after the "Systemindex" command segment. For example, a user can type the three characters ".Wh" followed by pressing the <tab> key as shown at 420. Upon receiving the <tab> key, the system can search for all matches to ".Wh". In this example, the system can narrow its search to command syntax because the system is alerted by the "." that starts the three-character string that the string that follows the "." is a separate command. Accordingly, the system need only apply syntax rules for commands in its search of completion sources to complete the "Wh". In this example, the system only finds the "Where" command as a possible segment completion choice. Having only found one choice, the system adds "Where" to the computer console command line interface as shown at 420.

It will be appreciated that numerous computer programming and scripting languages can use a command line interface for command input. It will also be appreciated that different languages may have different syntax indicators for starting a command or a command segment and that the invention is not limited to commands or command segments that begin with a ".".

FIG. 4F is a diagram of an example computer console with a command line interface 400. In a continuation of an example from FIG. 4E, a user can complete the Where command by typing the characters "("A>100")" into the computer console command line interface as shown at 424. If a user has no further command or parameter segments to add to the command string, the user can then press the <ENTER> key to execute the completed command.

It will be appreciated that the user can also add more commands, parameters, variables, and tokens to the command line interface to further narrow the results instead of pressing the <ENTER> key after the "Where("A>100")" segment is added. Because each segment of the full command is treated individually, the user is not limited to a specific number of segments for the command completion process. A user can continue to type characters into the computer console command line interface and press the <tab> key iteratively to create a desired full command.

Figure 5:
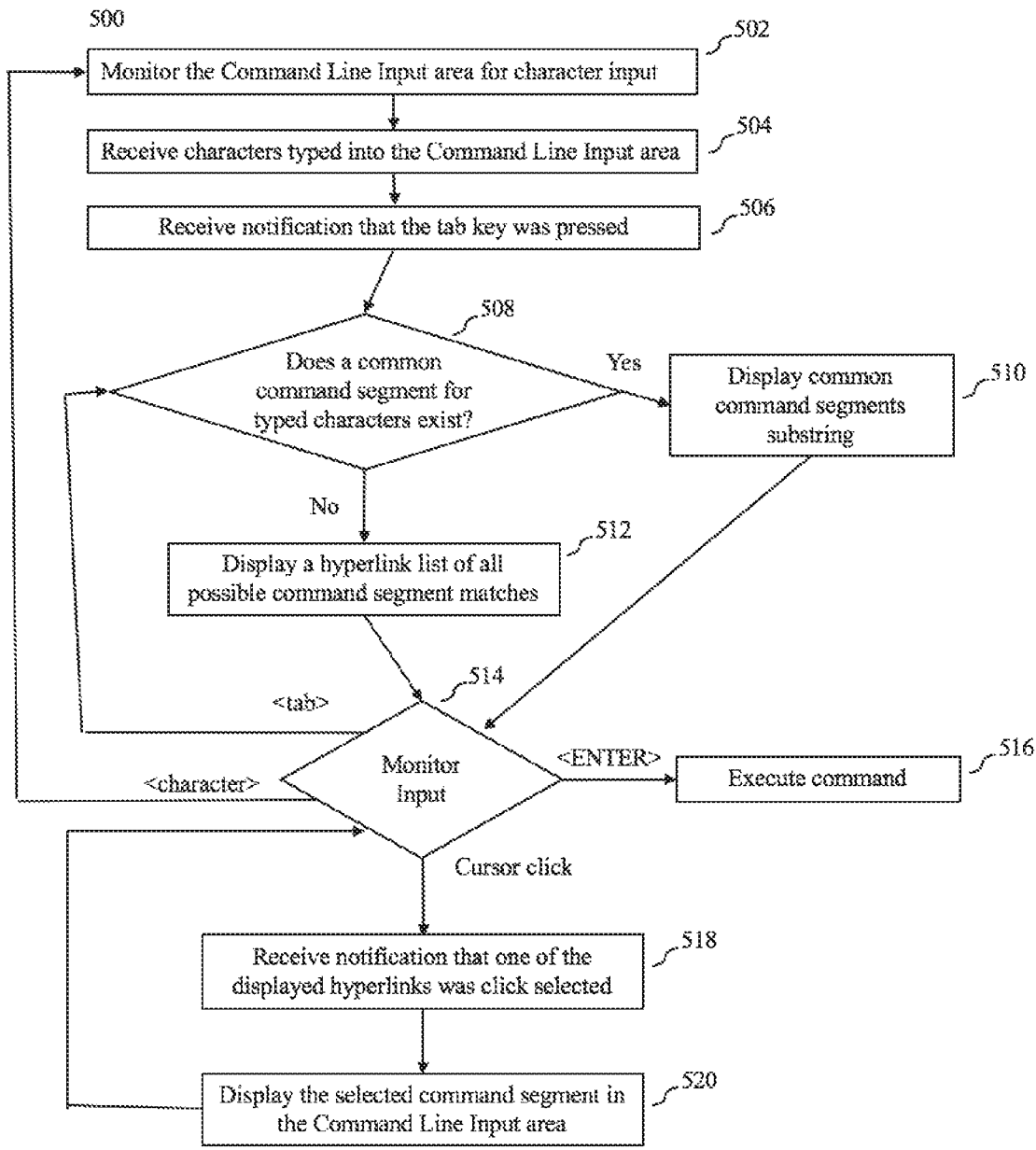
FIG. 5 is a diagram of an example flow chart for assisted completion of hyperlink command segments.

FIG. 5 is a diagram of an example flow chart for assisted completion of hyperlink command segments. Processing begins at 502, when the system monitors the computer console command line area for character input by a user. Processing continues to 504.

At 504, the system receives characters typed into the computer console command line interface input area. Processing continues to 506.

At 506, the system receives notification that the <tab> key was pressed. Processing continues to 508.

At 508, the system determines whether a common command segment for the received typed characters followed by a <tab> key exists by searching command segment sources for matches to the typed characters. If a common command segment exists, processing continues to 510. If a common command segment does not exist, processing continues to 512.

At 510, the system displays the common command segment substring in the computer console command line interface input area. Processing continues to 514.

At 512, the system displays a list of hyperlinks of all possible command segment matches. Processing continues to 514.

At 514, the system monitors for further input into the computer console command line interface input area or from the displayed hyperlink command segments area. Here the system is monitoring for one of four input events: the pressing of a designated hot key such as a <tab> key, the cursor or similar pointing device or function clicking on a hyperlink command segment in the displayed hyperlink command segments area, the pressing of an execution key such as an <ENTER> key, or the entering of a character. If a character is detected, processing returns to 502. If a designated hot key such as a <tab> key is detected, processing returns to 508. If an execution key such as an <ENTER> key is detected, processing continues to 516. If a cursor click or similar pointing device or function clicking on a hyperlink command segment in the displayed hyperlink command segments area is detected, processing continues to 518.

At 516, the command in the command line interface area is executed.

At 518, a notification that one of the hyperlinks was clicked or chosen by similar means is received. Processing continues to 520.

At 520, the hyperlinked command segment selected by a cursor click or similar means is displayed in the computer console command line input area. If there is already a displayed command segment in the computer console command line input area, the selected command segment is concatenated with the existing command segment. Processing returns to 514 to continue monitoring for input.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC), a field programmable gate array (FPGA), graphics processing unit (GPU), or the like. The instructions can be compiled from source code instructions provided in accordance with a programming language such as Java, C, C++, C#.net, assembly or the like. The instructions can also comprise code and data objects provided in accordance with, for example, the Visual Basic™ language, a specialized database query language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, or the like.

It is, therefore, apparent that there is provided, in accordance with the various embodiments disclosed herein, methods, systems and computer readable media for computer assisted completion of hyperlink command segments.

Application Ser. No. 15/154,974, entitled "DATA PARTITIONING AND ORDERING" and filed in the United States Patent and Trademark Office on May 14, 2016, is hereby incorporated by reference herein in its entirety as if fully set forth herein.

Application Ser. No. 15/154,975, entitled "COMPUTER DATA SYSTEM DATA SOURCE REFRESHING USING AN UPDATE PROPAGATION GRAPH" and filed in the United States Patent and Trademark Office on May 14, 2016, is hereby incorporated by reference herein in its entirety as if fully set forth herein.

Application Ser. No. 15/154,979, entitled "COMPUTER DATA SYSTEM POSITION-INDEX MAPPING" and filed in the United States Patent and Trademark Office on May 14, 2016, is hereby incorporated by reference herein in its entirety as if fully set forth herein.

Application Ser. No. 15/154,980, entitled "SYSTEM PERFORMANCE LOGGING OF COMPLEX REMOTE QUERY PROCESSOR QUERY OPERATIONS" and filed in the United States Patent and Trademark Office on May 14, 2016, is hereby incorporated by reference herein in its entirety as if fully set forth herein.

Application Ser. No. 15/154,983, entitled "DISTRIBUTED AND OPTIMIZED GARBAGE COLLECTION OF REMOTE AND EXPORTED TABLE HANDLE LINKS TO UPDATE PROPAGATION GRAPH NODES" and filed in the United States Patent and Trademark Office on May 14, 2016, is hereby incorporated by reference herein in its entirety as if fully set forth herein.

Application Ser. No. 15/154,984, entitled "COMPUTER DATA SYSTEM CURRENT ROW POSITION QUERY LANGUAGE CONSTRUCT AND ARRAY PROCESSING QUERY LANGUAGE CONSTRUCTS" and filed in the United States Patent and Trademark Office on May 14, 2016, is hereby incorporated by reference herein in its entirety as if fully set forth herein.

Application Ser. No. 15/154,985, entitled "PARSING AND COMPILING DATA SYSTEM QUERIES" and filed in the United States Patent and Trademark Office on May 14, 2016, is hereby incorporated by reference herein in its entirety as if fully set forth herein.

Application Ser. No. 15/154,987, entitled "DYNAMIC FILTER PROCESSING" and filed in the United States Patent and Trademark Office on May 14, 2016, is hereby incorporated by reference herein in its entirety as if fully set forth herein.

Application Ser. No. 15/154,988, entitled "DYNAMIC JOIN PROCESSING USING REAL-TIME MERGED NOTIFICATION LISTENER" and filed in the United States Patent and Trademark Office on May 14, 2016, is hereby incorporated by reference herein in its entirety as if fully set forth herein.

Application Ser. No. 15/154,990, entitled "DYNAMIC TABLE INDEX MAPPING" and filed in the United States Patent and Trademark Office on May 14, 2016, is hereby incorporated by reference herein in its entirety as if fully set forth herein.

Application Ser. No. 15/154,991, entitled "QUERY TASK PROCESSING BASED ON MEMORY ALLOCATION AND PERFORMANCE CRITERIA" and filed in the United States Patent and Trademark Office on May 14, 2016, is hereby incorporated by reference herein in its entirety as if fully set forth herein.

Application Ser. No. 15/154,993, entitled "A MEMORY-EFFICIENT COMPUTER SYSTEM FOR DYNAMIC UPDATING OF JOIN PROCESSING" and filed in the United States Patent and Trademark Office on May 14, 2016, is hereby incorporated by reference herein in its entirety as if fully set forth herein.

Application Ser. No. 15/154,995, entitled "QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/154,996, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/154,997, entitled "DYNAMIC UPDATING OF QUERY RESULT DISPLAYS" and filed in the United States Patent and Trademark Office on May 14, 2016, is hereby incorporated by reference herein in its entirety as if fully set forth herein.

Application Ser. No. 15/154,998, entitled "DYNAMIC CODE LOADING" and filed in the United States Patent and Trademark Office on May 14, 2016, is hereby incorporated by reference herein in its entirety as if fully set forth herein.

Application Ser. No. 15/154,999, entitled "IMPORTATION, PRESENTATION. AND PERSISTENT STORAGE OF DATA" and filed in the United States Patent and Trademark Office on May 14, 2016, is hereby incorporated by reference herein in its entirety as if fully set forth herein.

Application Ser. No. 15/155,001, entitled "COMPUTER DATA DISTRIBUTION ARCHITECTURE" and filed in the United States Patent and Trademark Office on May 14, 2016, is hereby incorporated by reference herein in its entirety as if fully set forth herein.

Application Ser. No. 15/155,005, entitled "PERSISTENT QUERY DISPATCH AND EXECUTION ARCHITECTURE" and filed in the United States Patent and Trademark Office on May 14, 2016, is hereby incorporated by reference herein in its entirety as if fully set forth herein.

Application Ser. No. 15/155,006, entitled "SINGLE INPUT GRAPHICAL USER INTERFACE CONTROL ELEMENT AND METHOD" and filed in the United States Patent and Trademark Office on May 14, 2016, is hereby incorporated by reference herein in its entirety as if fully set forth herein.

Application Ser. No. 15/155,007, entitled "GRAPHICAL USER INTERFACE DISPLAY EFFECTS FOR A COMPUTER DISPLAY SCREEN" and filed in the United States Patent and Trademark Office on May 14, 2016, is hereby incorporated by reference herein in its entirety as if fully set forth herein.

Application Ser. No. 15/155,009, entitled "COMPUTER ASSISTED COMPLETION OF HYPERLINK COMMAND SEGMENTS" and filed in the United States Patent and Trademark Office on May 14, 2016, is hereby incorporated by reference herein in its entirety as if fully set forth herein.

Application Ser. No. 15/155,010, entitled "HISTORICAL DATA REPLAY UTILIZING A COMPUTER SYSTEM" and filed in the United States Patent and Trademark Office on May 14, 2016, is hereby incorporated by reference herein in its entirety as if fully set forth herein.

Application Ser. No. 15/155,011, entitled "DATA STORE ACCESS PERMISSION SYSTEM WITH INTERLEAVED APPLICATION OF DEFERRED ACCESS CONTROL FILTERS" and filed in the United States Patent and Trademark Office on May 14, 2016, is hereby incorporated by reference herein in its entirety as if fully set forth herein.

Application Ser. No. 15/155,012, entitled "REMOTE DATA OBJECT PUBLISHING/SUBSCRIBING SYSTEM HAVING A MULTICAST KEY-VALUE PROTOCOL" and filed in the United States Patent and Trademark Office on May 14, 2016, is hereby incorporated by reference herein in its entirety as if fully set forth herein.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A system for computer processor assisted completion of command segments, the system comprising:
   one or more hardware processors;
   a computer console coupled to the one or more hardware processors;
   a computer readable data storage device coupled to the one or more hardware processors, the computer readable data storage device having stored thereon software instructions that, when executed by the one or more hardware processors, cause the one or more hardware processors to perform operations including:
   (a) using the computer processor for monitoring for input in a computer console command line interface;
   (b) receiving, by the computer processor, one or more characters input into the computer console command line interface;
   (c) receiving, by the computer processor, a first designated hot key character input into the computer console command line interface;
   (d) upon receiving the first designated hot key character, using the computer processor for searching one or more potential command line completion sources in a computer memory for segment matches with the one or more received characters input into the computer console command line interface;

(e) if a plurality of segment matches is found, determining whether the plurality of segment matches have a common segment stem;

(f) if the common segment stem is found, displaying the common segment stem in the computer console command line interface and proceeding to step (j), wherein, if there is already a displayed command segment in the computer console command line interface, concatenating the common segment stem with the displayed command segment;

(g) if no common segment stem is found, displaying as one or more hyperlinks in proximity to the computer console command line interface at least a portion of the plurality of segment matches found in the one or more potential command line completion sources;

(h) if a selection of one of the one or more hyperlinks in proximity to the computer console command line interface is received, displaying the selection of the one of the one or more hyperlinks in proximity to the computer console command line interface in the computer console command line interface;

(i) if one or more additional characters are received, displaying the one or more received additional characters in the computer console command line interface and proceeding to step (k);

(j) using the computer processor for monitoring for character input into the computer console command line interface;

(k) if a second designated hot key character is not received, repeat steps (a) through (i) to process a next command segment, wherein each command segment is processed for completion individually, and wherein one or more of the one or more additional characters or the one or more received characters input into the computer console command line interface and one or more of the first designated hot key character or the second designated hot key character are processed to iteratively create a full command from a plurality of command segments; and (l) if the second designated hot key character is received, execute one or more command segments using the computer processor, wherein, after input of a first command is started, when the one or more of the one or more received additional characters or the one or more received characters input into the computer console command line interface indicate a start of a second command separate from the first command, the searching includes narrowing the searching to a command syntax completion source of the one or more potential command line completion sources, wherein the second command is not a parameter of the first command, and wherein the execute command segments using the computer processor includes executing the first command and executing the second command.

2. The system of claim 1, wherein the one or more potential command line completion sources include at least one source from a command history, a command syntax file, a database name space source, or a table name source.

3. The system of claim 1, wherein the selection includes a cursor click operation.

4. The system of claim 1, wherein at least one of the first designated hot key character or a second designated hot key character includes a <tab> key character.

5. The system of claim 1, wherein displaying as one or more displayed hyperlinks in proximity to the computer console command line interface any of the plurality of segment matches found in the one or more potential command line completion sources includes displaying an indicator if one or more additional hyperlinks are available off-screen.

6. A method for computer processor assisted completion of command segments comprising:

(a) using the computer processor for monitoring for input in a computer console command line interface;

(b) receiving, by the computer processor, one or more characters input into the computer console command line interface;

(c) receiving, by the computer processor, a first designated hot key character input into the computer console command line interface;

(d) upon receiving the first designated hot key character, using the computer processor for searching one or more potential command line completion sources in a computer memory for segment matches with the received characters input into the computer console command line interface;

(e) when a plurality of segment matches is found, determining whether the plurality of segment matches have a common segment stem;

(f) when the common segment stem is found, displaying the common segment stem in the computer console command line interface, displaying as one or more first hyperlinks in proximity to the computer console command line interface at least a portion of a plurality of common segment matches found in the potential command line completion sources and proceeding to step (j), wherein, if there is already a displayed command segment in the computer console command line interface, concatenating the common segment stem with the displayed command segment;

(g) when no common segment stem is found, displaying as one or more second hyperlinks in proximity to the computer console command line interface at least a portion of the plurality of segment matches found in the one or more potential command line completion sources;

(h) when a selection of one of the one or more first hyperlinks or the one of the one or more second hyperlinks in proximity to the computer console command line interface is received, displaying the selection in proximity to the computer console command line interface;

(i) when one or more additional characters are received, displaying the one or more additional characters in the computer console command line interface;

(j) using the computer processor for monitoring for character input into the computer console command line interface; and (k) when a second designated hot key character is received, repeating (a)-(j) to process a next command segment, wherein each command segment is processed for completion individually, and wherein one or more of the one or more additional characters or the one or more received characters input into the computer console command line interface and the first designated hot key character or the second designated hot key character are processed to iteratively create a full command from a plurality of command segments.

7. The method of claim 6, wherein the one or more potential command line completion sources include at least one source from a command history, a command syntax file, a database name space source, or a table name source.

8. The method of claim 6, wherein at least one of the first designated hot key character or a second designated hot key character includes a <tab> key character.

9. The method of claim 6, wherein displaying as one or more displayed hyperlinks in proximity to the computer console command line interface any of the plurality of segment matches found in the one or more potential command line completion sources includes displaying an indicator if one or more additional hyperlinks are available off-screen.

10. The method of claim 6,
wherein, after input of a first command is started, when the one or more of the one or more received additional characters or the one or more received characters input into the computer console command line interface indicate a start of a second command separate from the first command, the searching includes narrowing the searching to a command syntax completion source of the one or more potential command line completion sources.

11. The method of claim 10, wherein the second command is not a parameter of the first command.

12. The method of claim 6, wherein the selection of the one of the one or more hyperlinks is received when a user clicks on the one of the one or more hyperlinks.

13. The method of claim 6,
wherein, when the plurality of segment matches includes too many matches to display, the displaying as one or more displayed hyperlinks includes:
displaying as the one or more displayed hyperlinks a first portion of the plurality of segment matches;
presenting an indicator of too many matches to display; and
displaying an additional page of matches to display a second portion of the plurality of segment matches as one or more additional hyperlinks, the second portion consisting of one or more segment matches of the plurality of segment matches not included in the first portion of the plurality of segment matches.

14. A nontransitory computer readable medium having stored thereon software instructions that, when executed by one or more computer processors, cause the one or more processors to perform operations including:
(a) using the one or more computer processors to monitor for input in a computer console command line interface;
(b) receiving, by the one or more computer processors, one or more characters input into the computer console command line interface;
(c) receiving, by the one or more computer processors, a first designated hot key character input into the computer console command line interface;
(d) upon receiving the first designated hot key character, using the one or more computer processors for searching one or more potential command line completion sources in a computer memory for segment matches with the received characters input into the computer console command line interface;
(e) if a plurality of segment matches is found, determining whether the plurality of segment matches have a common segment stem;
(f) if the common segment match is found, displaying the common segment match in the computer console command line interface and proceeding to step (k), wherein, if there is already a displayed command segment in the computer console command line interface, concatenating the common segment stem with the displayed command segment;
(g) if no common segment stem is found, displaying as one or more displayed hyperlinks in proximity to the computer console command line interface at least a portion of the plurality of segment matches found in the one or more potential command line completion sources;
(h) receiving by the computer processor a selection of one of the one or more hyperlinks in proximity to the computer console command line interface or one or more additional characters;
(i) if the selection of one of the one or more hyperlinks in proximity to the computer console command line interface is received, displaying the selection of one of the one or more hyperlinks in proximity to the computer console command line interface in the computer console command line interface;
(j) if the one or more additional characters are received, displaying the one or more additional characters in the computer console command line interface and proceeding to step (l);
(k) using the computer processor for monitoring for character input into the computer console command line interface;
(l) if a second designated hot key character is not received, repeat steps (a) through (j) to process a next command segment, wherein each command segment is processed for completion individually, and wherein one or more of the one or more additional characters or the one or more characters input into the computer console command line interface and one or more of the first designated hot key character or the second designated hot key character are processed to iteratively create a full command from a plurality of command segments; and
(m) if the second designated hot key character is received, execute the command segments using the computer processor.

15. The nontransitory computer readable medium of claim 14, wherein the one or more potential command line completion sources include at least one source from a command history, a command syntax file, a database name space source, or a table name source.

16. The nontransitory computer readable medium of claim 14, wherein the selection includes a cursor click operation.

17. The nontransitory computer readable medium of claim 14, wherein at least one of the first designated hot key character or a second designated hot key character includes a <tab> key character.

18. The nontransitory computer readable medium of claim 14, wherein displaying as one or more displayed hyperlinks in proximity to the computer console command line interface any of the plurality of segment matches found in the one or more potential command line completion sources includes displaying an indicator if one or more additional hyperlinks are available off-screen.

19. The nontransitory computer readable medium of claim 14,
wherein, after input of a first command is started, when the one or more of the one or more received additional characters or the one or more received characters input into the computer console command line interface indicate a start of a second command separate from the first command, the searching includes narrowing the searching to a command syntax completion source of the one or more potential command line completion sources.

20. The nontransitory computer readable medium of claim 19, wherein the second command is not a parameter of the first command.

21. The nontransitory computer readable medium of claim 14, wherein the selection of the one of the one or more hyperlinks is received when a user clicks on the one of the one or more hyperlinks with a cursor.

22. The nontransitory computer readable medium of claim 14,
wherein, when the plurality of segment matches includes too many matches to display, the displaying as one or more displayed hyperlinks includes:
displaying as the one or more displayed hyperlinks a first portion of the plurality of segment matches;
presenting an indicator of too many matches to display; and
displaying an additional page of matches to display a second portion of the plurality of segment matches as one or more additional hyperlinks, the second portion consisting of one or more segment matches of the plurality of segment matches not included in the first portion of the plurality of segment matches.

* * * * *